(12) United States Patent
Ho et al.

(10) Patent No.: US 8,462,044 B1
(45) Date of Patent: Jun. 11, 2013

(54) DETERMINING TRANSMIT LOCATION OF AN EMITTER USING A SINGLE GEOSTATIONARY SATELLITE

(75) Inventors: Dominic K. C. Ho, Columbia, MO (US); Jeffrey C. Chu, Los Altos, CA (US); Michael L. Downey, Livermore, CA (US)

(73) Assignee: Glowlink Communications Technology, Inc., Los Altos, CA (US)

( * ) Notice: Subject to any disclaimer, the term of this patent is extended or adjusted under 35 U.S.C. 154(b) by 267 days.

(21) Appl. No.: 13/014,660

(22) Filed: Jan. 26, 2011

Related U.S. Application Data

(60) Provisional application No. 61/381,427, filed on Sep. 9, 2010, provisional application No. 61/326,630, filed on Apr. 21, 2010.

(51) Int. Cl.
*H04B 7/185* (2006.01)
*H04B 7/19* (2006.01)
*G01S 19/38* (2010.01)

(52) U.S. Cl.
USPC .................. 342/353; 342/356; 342/357.78

(58) Field of Classification Search
USPC ............... 342/353, 356, 357.78, 453, 450
See application file for complete search history.

(56) References Cited

U.S. PATENT DOCUMENTS 5,008,679 A * 4/1991 Effland et al. ............... 342/353
5,629,707 A * 5/1997 Heuvel et al. ............ 342/357.2

\* cited by examiner

*Primary Examiner* — Cassie Galt
(74) *Attorney, Agent, or Firm* — Westberg Law Offices

(57) ABSTRACT

The present invention provides a method and apparatus for determining the transmit location of an emitter using a single geostationary satellite. In an embodiment, a signal is received at a ground station from the emitter and relayed by the geostationary satellite. The signal is received at the ground station at a plurality of time instances and has a plurality of observed frequencies, one for each time instance. A plurality of lines of position are determining based on the plurality of observed frequencies. The transmit location of the emitter is determined based on at least one intersection among the plurality of lines of position.

41 Claims, 15 Drawing Sheets

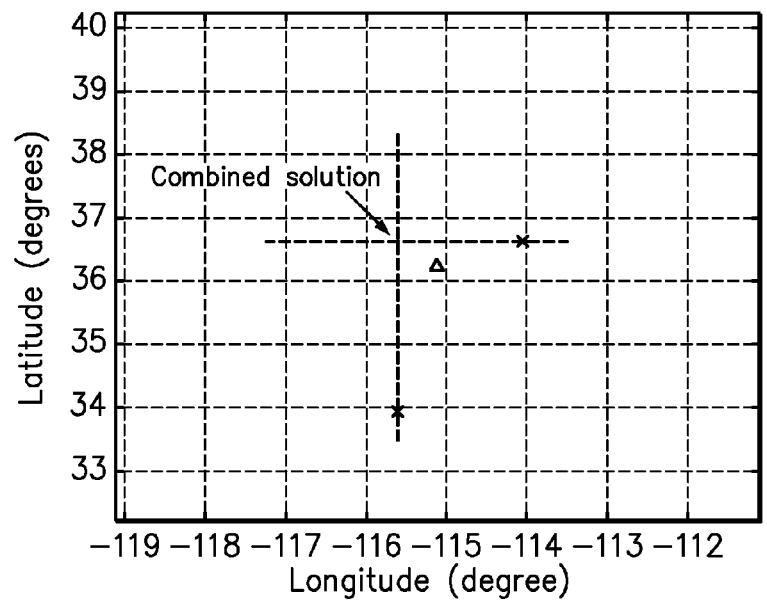
FIG. 15
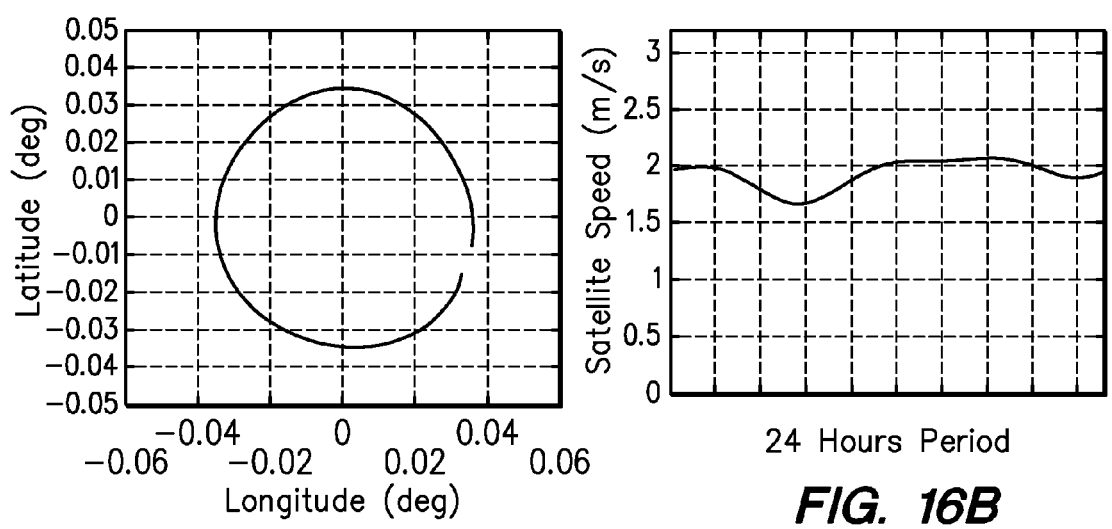
FIG. 16A
FIG. 16B

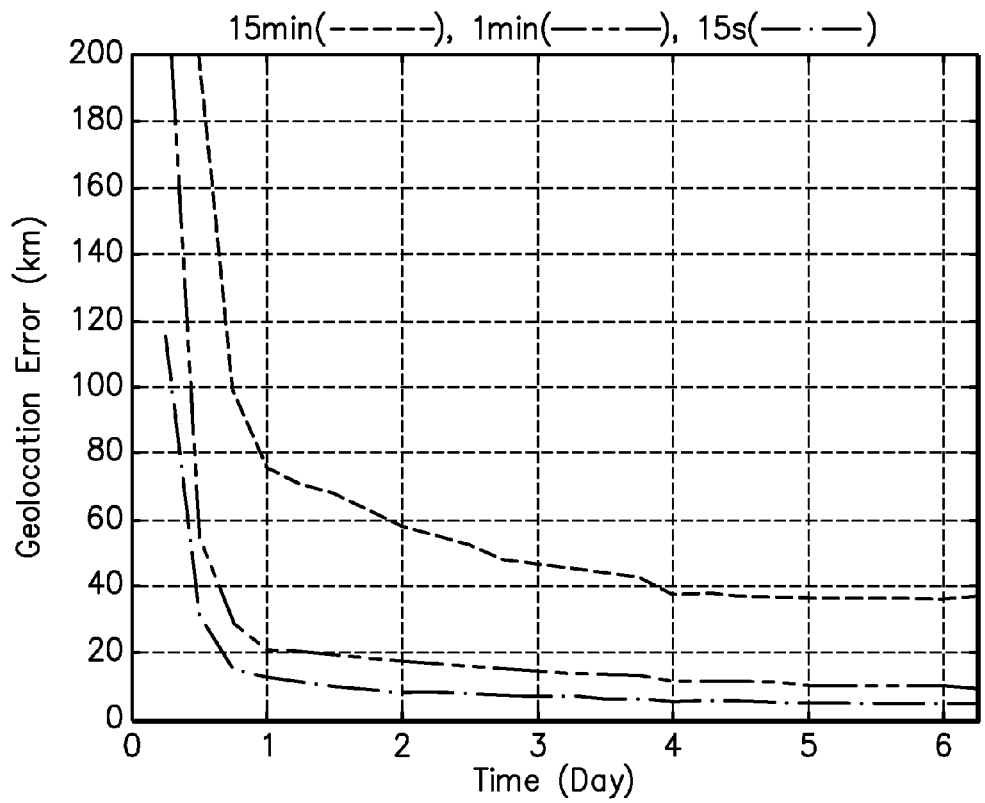
FIG. 18
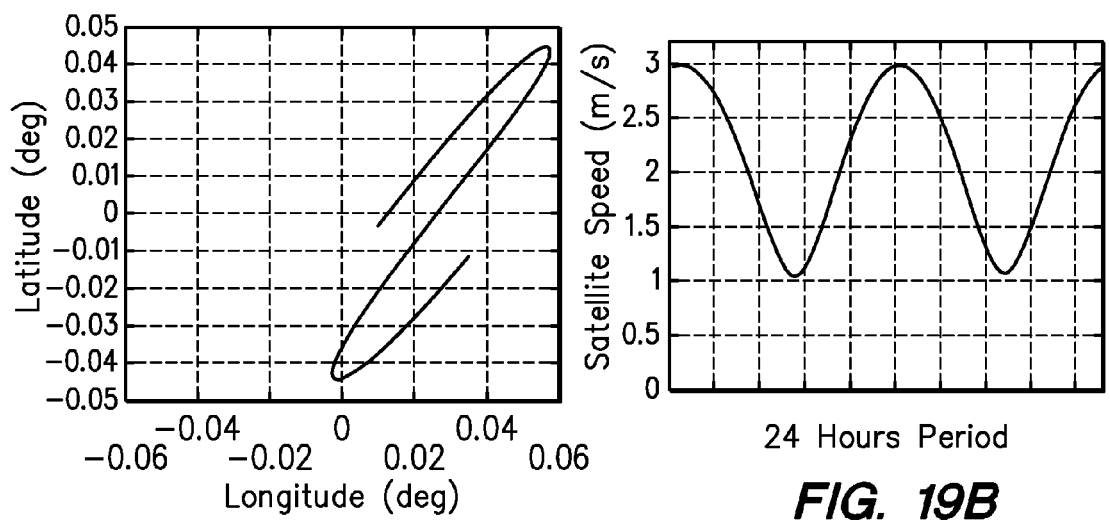
FIG. 19A
FIG. 19B

DETERMINING TRANSMIT LOCATION OF AN EMITTER USING A SINGLE GEOSTATIONARY SATELLITE

This application claims the benefit of U.S. Provisional Application No. 61/381,427, filed Sep. 9, 2010 and U.S. Provisional Application No. 61/326,630, filed Apr. 21, 2010. The entire contents of each of these provisional applications are hereby incorporated by reference.

BACKGROUND OF THE INVENTION

The present invention relates to determining the transmit location of an unknown emitter.

Existing techniques for determining the location of an unknown emitter which is being transmitted across satellites in the geostationary/geosynchronous orbit require at least two satellites. Generally speaking, these geolocation techniques work as follows. Two satellites, called the primary and the adjacent satellite, receive the signal transmitted from the unknown emitter. The two satellites relay the transmitted signal to a ground receiving station. The ground station computes the time difference of arrival (TDOA) and the frequency difference of arrival (FDOA) between the two signals relayed by the satellites. The location of the unknown emitter is obtained using the TDOA, the FDOA and the satellite ephemeris data. If only either the TDOA or the FDOA is observed, an additional adjacent satellite is necessary to provide an additional TDOA or FDOA measurement for localization. A reference emitter whose transmit position is known can be used to reduce the amount of uncertainty in satellite positions and velocities to improve the localization accuracy. However, if only one satellite is available, neither TDOA nor FDOA can be measured for geolocation.

SUMMARY OF THE INVENTION

The present invention provides a method and apparatus for determining the transmit location of an emitter using a single geostationary satellite. In an embodiment, a signal is received at a ground station from the emitter and relayed by a geostationary satellite. The signal is received at first and second time instances. A first line of position is determined based on a first difference in frequency for the received signal between the first and second time instances. The signal is further received at the ground station at third and fourth time instances. A second line of position is determined based on a second difference in frequency for the received signal between the third and fourth time instances. The transmit location of the emitter is determined based on the first line of position and the second line of position.

In another embodiment, a signal is received at a ground station from an emitter and relayed by a geostationary satellite. The signal is received at the ground station at a plurality of time instances and has a plurality of observed frequencies, one for each time instance. A plurality of lines of position are determining based on the plurality of observed frequencies. The transmit location of the emitter is determined based on at least one intersection among the plurality of lines of position.

BRIEF DESCRIPTION OF THE DRAWINGS

The present invention is described with respect to particular exemplary embodiments thereof and reference is accordingly made to the drawings in which:

FIG. 15 illustrates combining latitude and longitude estimates from different solutions in accordance with an embodiment of the present invention;

FIGS. 16A-B illustrate exemplary satellite motion and velocity over 24-hour period in accordance with an embodiment of the present invention;

FIG. 18 illustrates geolocation accuracy using the ML solution at different data collection intervals in accordance with an embodiment of the present invention;

FIG. 19 illustrates another exemplary satellite motion and velocity over 24-hour period in accordance with an embodiment of the present invention;

DETAILED DESCRIPTION OF A PREFERRED EMBODIMENT OF THE INVENTION

This invention discloses the use of a single geostationary satellite to determine the transmit location of an unknown emitter on earth. Although it is small, geostationary satellites do have some movement with respect to the earth. This movement creates a Doppler frequency shift on the signal transmitted by the unknown emitter and relayed by the satellite when it is observed at a ground station. The amount of Doppler shift is dependent on the transmitted frequency, the relative positions between the unknown emitter and the satellite, and the satellite velocity. This invention exploits the small Doppler frequency shift caused by the motion of a single geostationary satellite for determining the transmit location of an unknown emitter.

The application of Doppler created by a single satellite for geolocation has been used previously for satellites in the lower orbits. Lower orbit satellites have significant motion with respect to earth and their position changes at different times. Hence, the large motion of these low earth orbit satellites creates a significant and easily observable amount of Doppler frequency change. The Doppler frequencies at several time instances can fix a ground emitter. Indeed, this is the technique adopted in the search and rescue satellite (SARSAT) localization system.

The use of Doppler from a single geostationary satellite for the purpose of localization is not straightforward and is a much more challenging problem. This is because the motion of a geostationary satellite with respect to the earth is by nature very small and the resulting Doppler shift is also very small and much more challenging to accurately observe. In addition, the use of Doppler is further complicated by the fact that the uplink frequency of the ground emitter is unknown, the exact frequency of the satellite local oscillator is unknown and the satellite ephemeris data can have significant uncertainty in the satellite position and velocity. This invention provides the concept and the technique for determining the transmit location of an unknown emitter using just a single geostationary/geosynchronous satellite.

We shall first present the modeling of the frequency of a signal observed at a ground station that is transmitted by an unknown emitter and is relayed by a geostationary satellite. The concept of Doppler time difference and the use of it for geolocation will be elaborated. The different error components that contribute to the frequency error are examined. Processing techniques and algorithms to mitigate the frequency error for improving the geolocation accuracy will be presented. Some sequential geolocation methods will be introduced and an illustrative example on the invention of the single satellite geolocation system will be described together with some performance analysis.

I. Modeling of Received Signal Frequency

I.1 Doppler Effects

Figure 1:
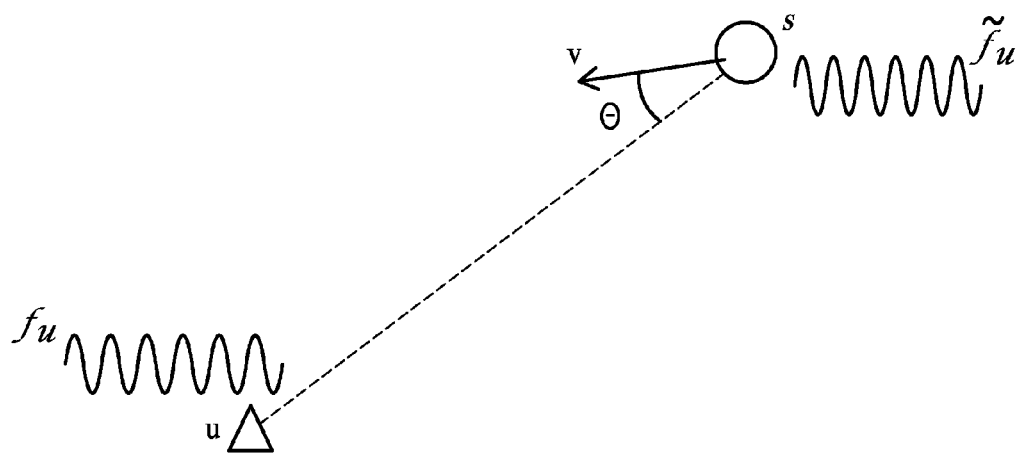
FIG. 1 illustrates Doppler effects of an emitted sinusoid accordance with an embodiment of the present invention.

We shall first describe the basics of the Doppler effects. Let us consider a scenario where a source located at $u=[x_u,y_u,z_u]^T$ transmits a sinusoid with frequency $f_u$. The transmitted signal reaches a receiver at $s=[x_s,y_s,z_s]^T$ that is moving with a velocity $v=[v_x,v_y,v_z]^T$. FIG. 1 shows Doppler effects of an emitted sinusoid from the source at u to the receiver at s as well as the relative geometry between the source and the receiver. Due to the relative motion between them, the received signal is subject to the Doppler effects and its frequency observed at the receiver is $$\tilde{f}_u = f_u + f_d, \qquad (1)$$

where $f_d$ is the Doppler frequency shift and it is equal to $$f_d = f_u \frac{\|v\|}{p} \cos(\theta). \qquad (2)$$

In (2), $\|*\|$ denotes the Euclidean norm and p is the signal propagation speed. $\theta$ is the angle between v and the line joining s and u as shown in FIG. 1. For notation simplicity, let $\rho_{u,s}$ be a unit vector pointing from s to u, i.e.

$$\rho_{u,s} = \frac{(u-s)}{\|u-s\|}. \qquad (3)$$

From the definition of the dot-product between v and $\rho_{u,s}$, we have $$\|v\|\cos(\theta) = v^T \rho_{u,s}. \qquad (4)$$

As a result, the observed frequency in (1) can be expressed as $$\tilde{f}_u = f_u\left(1 + \frac{1}{p}v^T \rho_{u,s}\right). \qquad (5)$$

Equation (5) shows explicitly the functional dependency of the Doppler frequency component on the source position u.

I.2 Observed Frequency at Ground Station

Figure 2:
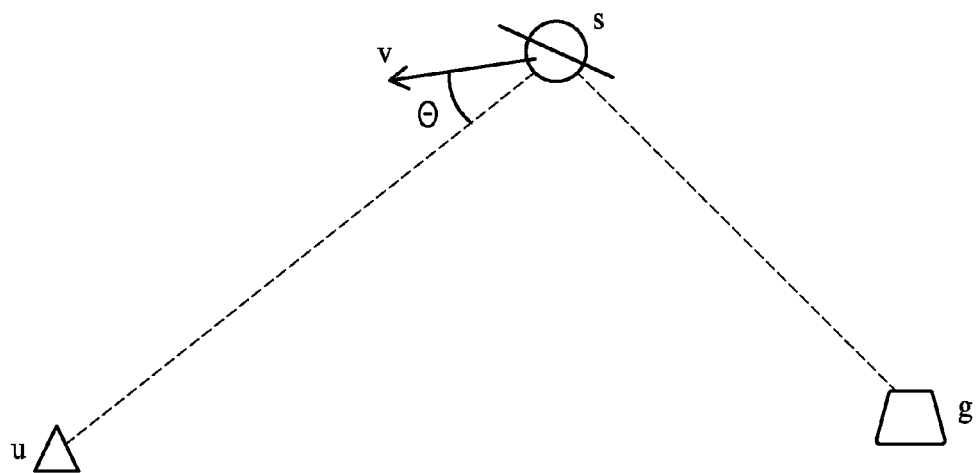
FIG. 2 illustrates a single satellite geolocation scenario in accordance with an embodiment of the present invention.

FIG. 2 shows a single satellite geolocation scenario in which the source at u transmits a signal that is received by the satellite at s moving with a velocity v, and the satellite relays the signal which is observed by a ground station at g.

We shall now consider the localization scenario as shown in FIG. 2. An emitter at unknown location $u=[x_u,y_u,z_u]^T$ on earth transmits a signal that is received by a geostationary satellite with position $s=[x_s,y_s,z_s]^T$ and velocity $v=[v_x,v_y,v_z]^T$. The geostationary satellite relays the received signal and is observed by a ground station at position $g=[x_g,y_g,z_g]^T$.

We shall again assume the emitter sends out a carrier at frequency $f_u$ and for simplicity shall assume that the emitting source and the receive ground station are at fixed positions on earth. From the discussion of Doppler effects described in Section I.1, the frequency of the transmitted signal at the satellite is given by Equation (5). The satellite performs frequency down-conversion in its transponder and the relayed signal frequency from the satellite back to earth is $$\tilde{f}_u + f_T = f_u\left(1 + \frac{1}{p}v^T \rho_{u,s}\right) + f_T \qquad (6)$$

where $f_T$ represents the satellite translation frequency and includes any offset from this nominal translation frequency. In most cases $f_T$ is negative because the downlink frequency is smaller than the uplink frequency. Since relative motion between the satellite and the ground station exists, the transmitted signal from the satellite will also be subjected to the Doppler effects. The signal frequency observed at the ground station is $$f_g = (\tilde{f}_u + f_T)\left(1 + \frac{1}{p}v^T\rho_{s,g}\right) \quad (7)$$

$$= \left(f_u + \frac{f_u}{p}v^T\rho_{u,s} + f_T\right)\left(1 + \frac{1}{p}v^T\rho_{s,g}\right).$$

Multiplying out and ignoring the cross-term between the two Doppler components because it is relatively small, (7) can be approximated by $$f_g = \left(f_u + \frac{f_u}{p}v^T\rho_{u,s} + f_T\right) + \left(\frac{f_{down}}{p}v^T\rho_{s,g}\right) \quad (8)$$

where $f_{down}$ is the downlink frequency of the satellite. The second term on the right of the above equation is known because the satellite's position and velocity are available from the ephemeris data. The Doppler frequency component $(f_u/p)v^T\rho_{u,s}$ is typically in the order of several to tens of Hertz but the original transmitted frequency $f_u$ is in the order of Gigahertz. As a result, the Doppler frequency is very difficult to observe from the received frequency $f_g$. We shall address this issue by using the time-differencing of two observed frequencies at two different time instances.

At a certain time $t_1$, the observed frequency at the ground station is $$f_g(t_1) = \left(f_u + \frac{f_u}{p}v(t_1)^T\rho_{u,s(t_1)} + f_T\right) + \left(\frac{f_{down}}{p}v(t_1)^T\rho_{s(t_1),g}\right) \quad (9)$$

where $s(t)$ and $v(t)$ represent the satellite position and its velocity at time t. Here we assume the transmitted frequency $f_u$ and the down-conversion frequency $f_T$ are stable and don't change significantly over time. Any random variations in these frequencies can be lumped into the measurement noise. Similarly, at another time $t_2$, we have $$f_g(t_2) = \left(f_u + \frac{f_u}{p}v(t_2)^T\rho_{u,s(t_2)} + f_T\right) + \left(\frac{f_{down}}{p}v(t_2)^T\rho_{s(t_2),g}\right). \quad (10)$$

The difference between them is $$f_g(t_2) - f_g(t_1) = \frac{f_u}{p}(v(t_2)^T\rho_{u,s(t_2)} - v(t_1)^T\rho_{u,s(t_1)}) + \quad (11)$$

$$\frac{f_{down}}{p}(v(t_2)^T\rho_{s(t_2),g} - v(t_1)^T\rho_{s(t_1),g}).$$

The last term on the right of (11) is known from the satellite ephemeris data and the position of the ground receiving station. As a result, we have $$f_{g,\Delta 21} = f_g(t_2) - f_g(t_1) - \frac{f_{down}}{p}(v(t_2)^T\rho_{s(t_2),g} - v(t_1)^T\rho_{s(t_1),g}) \quad (12)$$

$$= \frac{f_u}{p}(v(t_2)^T\rho_{u,s(t_2)} - v(t_1)^T\rho_{u,s(t_1)}).$$

We shall simply call $f_{g,\Delta 21}$ the Doppler Time-Difference (DTD). The DTD is in the magnitude of several Hertz to tens of Hertz, depending on the magnitude of the velocity of the geostationary satellite and the relative geometry between the emitter and the satellite. We shall next explore the DTD for geolocation.

II. Geolocation Using DTD

Figure 3:
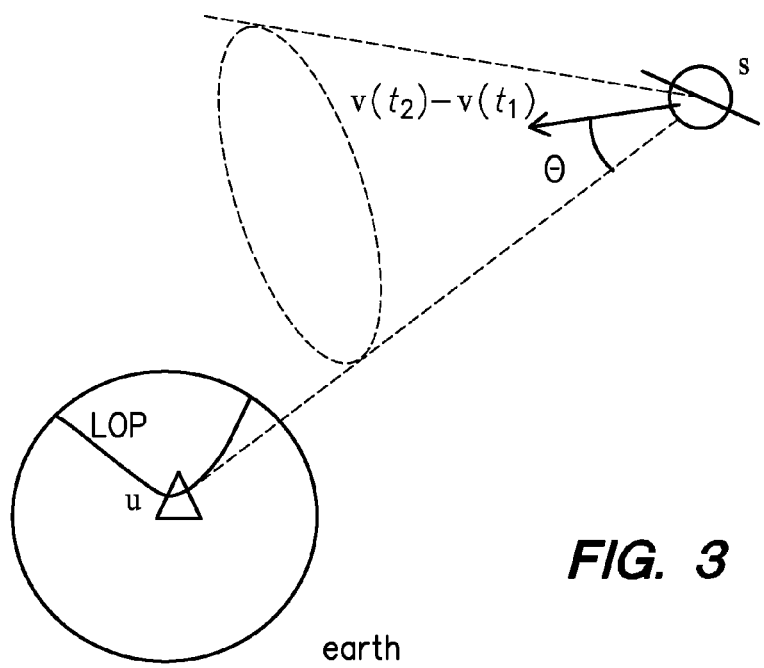
FIG. 3 illustrates formation of a line of position (LOP) on earth from a cone of constant Doppler time difference (DTD) in accordance with an embodiment of the present invention.

A geostationary satellite is far from earth and its position changes very little over time. If we make the simplification that $s=s(t_1)=s(t_2)$ in (12), then it becomes $$f_{g,\Delta 21} = \frac{f_u}{p}(v(t_2) - v(t_1))^T\rho_{u,s} \quad (13)$$

$$= \frac{f_u}{p}\|v(t_2) - v(t_1)\|\cos(\theta)$$

where $\theta$ is the angle between $(v(t_2)-v(t_1))$ and $\rho_{u,s}$. A constant DTD will define a cone starting at s with an angle $\theta$ around $(v(t_2)-v(t_1))$. Formation of the LOP on earth from the cone of constant DTD is shown explicitly in FIG. 3. The constant DTD cone will intersect the earth, giving a line-of-position (LOP) on earth in which the unknown emitter lies. Another DTD obtained from the satellite moving in a different direction will create a different LOP on earth. The crossing of the two LOPs will fix the position of the unknown emitter.

Figure 4:
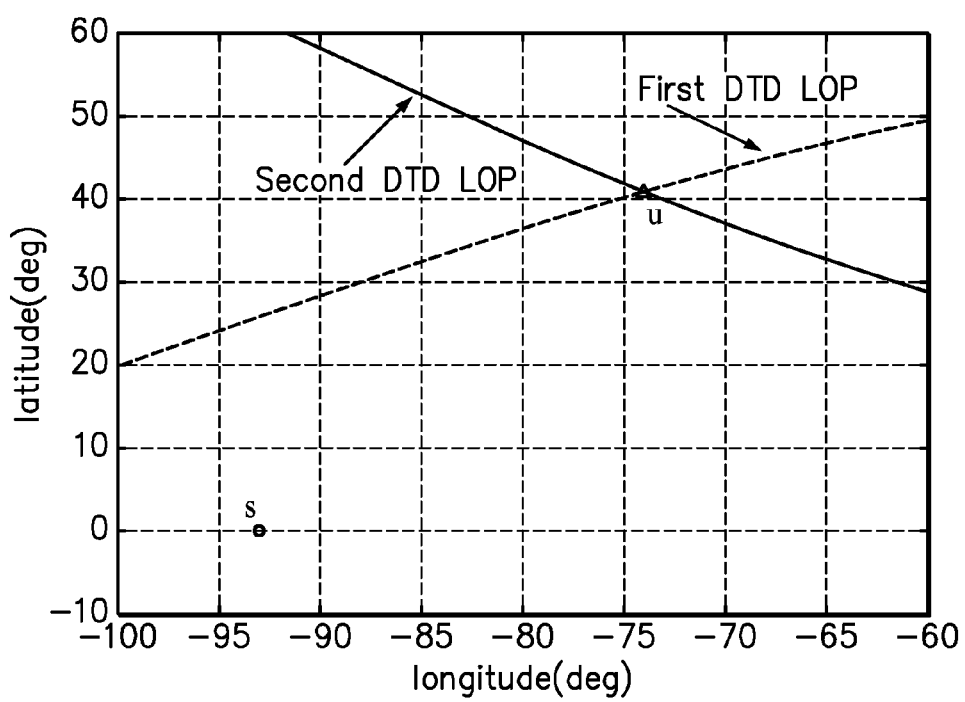
FIG. 4 illustrates an example of the intersection of two DTD LOPs that gives the location of an unknown emitter in accordance with an embodiment of the present invention.

FIG. 4 shows an example of the crossing of two DTD LOPs on earth that yields the location of the unknown emitter.

III. Differential Calibration

It is commonly known that the satellite ephemeris data can contain significant errors in the estimate of both satellite position and velocity. The estimated location of the unknown emitter using the single satellite Doppler technique described above is very sensitive to the accuracy of the satellite velocity. A small error in the satellite velocity can produce a significant error in the location of the unknown emitter.

We shall use a calibration emitter for the purpose of mitigating the error in the satellite ephemeris data. The calibration emitter is at a known position $c=[x_c,y_c,z_c]^T$. It transmits a calibration signal at a known frequency $f_c$ towards the satellite, the satellite relays the calibration signal to the ground station. Similar to (8), the observed calibration signal frequency at the ground station is $$f_{g,c} = \left(f_c + \frac{f_c}{p}v^T\rho_{c,s} + f_T\right) + \left(\frac{f_{down}}{p}v^T\rho_{s,g}\right) \quad (14)$$

Note that the second terms of $f_g$ and $f_{g,c}$, as shown in (8) and (14) are the same, because both the unknown emitter signal and the calibration signal have the same downlink path from the satellite to the ground station.

We define the calibration factor as $$C = \frac{f_u}{f_c}\left[f_{g,c} - \left(f_c + \frac{f_c}{p}v^T\rho_{c,s} + \frac{f_{down}}{p}v^T\rho_{s,g}\right)\right]. \quad (15)$$

In Equation (15), $f_{g,c}$ is the measured calibration frequency at the ground station and the term within the parentheses is computed using the known calibration source position c, its transmitted frequency $f_c$, the satellite ephemeris data, the downlink frequency and the ground station position. The factor $f_u/f_c$ is unity if the unknown emitter and the calibration emitter operate at the same uplink frequency.

Differential calibration is accomplished by (i) obtaining the observed frequency from the unknown emitter, $f_g$ and that from the calibration emitter, $f_{g,c}$, at the same time or in close proximity of time, (ii) forming the calibration factor C from (15), and (iii) subtracting the calibration factor from $f_g$ to form the calibrated unknown emitter frequency measurement:

$$\tilde{f}_g = f_g - C. \tag{16}$$

Figure 5:
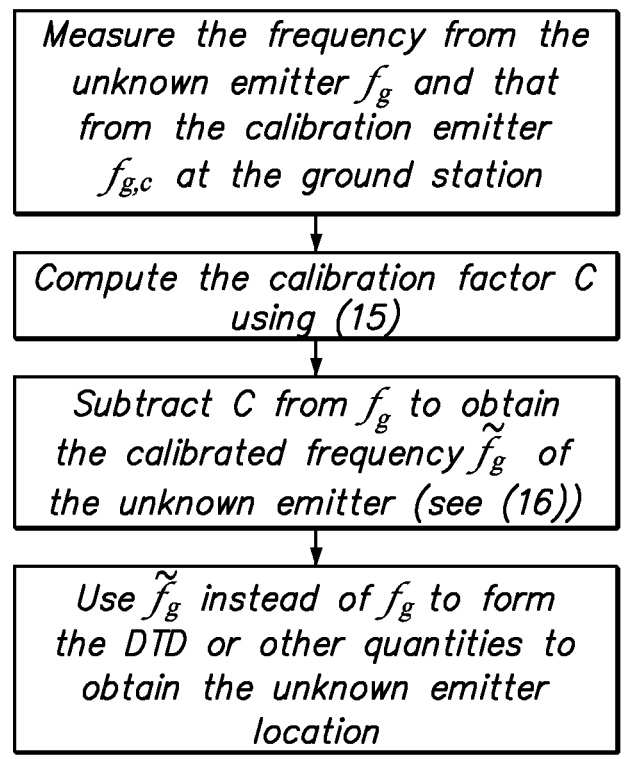
FIG. 5 illustrates a flow diagram of differential calibration for single satellite geolocation in accordance with an embodiment of the present invention.

FIG. 5 shows a flow diagram of differential calibration for single satellite geolocation. From Equation (16), we can obtain the calibrated DTD measurement as $$\tilde{f}_{g,\Delta_{21}} = \tilde{f}_g(t_2) - \tilde{f}_g(t_1) - \frac{f_{down}}{p}(v(t_2)^T \rho_{s(t_2),g} - v(t_1)^T \rho_{s(t_1),g}). \tag{17}$$

The functional dependency of $\tilde{f}_{g,\Delta_{21}}$ with the unknown emitter remains to have the same form as in Equation (12):

$$\tilde{f}_{g,\Delta_{21}} = \frac{f_u}{p}(v(t_2)^T \rho_{u,s(t_2)} - v(t_1)^T \rho_{u,s(t_1)}). \tag{18}$$

The values of all variables in Equation (18) are available except the emitter position u. Note that the frequency of the transmitted signal $f_u$ is not known precisely. However, since $f_u$ is in the order of Gigahertz, it can be replaced by the typical satellite uplink frequency of the appropriate frequency band and the resulting error in the unknown emitter position estimate is negligible.

Equation (18) defines a LOP on earth as described in Section II. Another LOP can be formed with a different measurement of the unknown emitter and the known calibration frequency at the ground station. The intersection of the two LOPs will give the unknown emitter position estimate. The differential calibration technique described here can significantly improve the geolocation accuracy, especially when the error in the satellite ephemeris data is large.

IV. Errors in the Frequency Measurement

The discussions so far have not considered the noise in the frequency measurement. In practice, the observed frequency $f_g$ of the unknown emitter at the ground station contains noise and the noise can significantly degrade the geolocation accuracy. The success of geolocation using a single geostationary satellite depends on how well we are able to mitigate the noise.

We shall discuss different components that contribute to the frequency noise. For simplicity, we assume a single calibration emitter is employed for differential calibration. The frequency noise has three main components: the first is from the acquisition in estimating the frequency value, the second is from the uplink frequency variation and the third is from the residual error of the satellite ephemeris data after differential calibration. These three components are independent and we shall discuss them separately.

IV.1 Acquisition Error

A typical unknown emitter transmits a CW signal or a modulated carrier. A CW signal is a pure sinusoid which is suitable for frequency measurement. For a modulated carrier, depending on the modulation format, different pre-processing techniques can be used to recover the carrier.

We shall use the following formula to model the carrier signal in which we would like to estimate its frequency:

$$x(n) = A \cos(2\pi f_o n + \phi) + \xi(n). \tag{19}$$

In Equation (19), x(n) is the signal sample, A is the amplitude, $\phi$ is the phase, $f_o$ is the unknown frequency to be estimated and $\xi(n)$ is the noise that is assumed to be zero-mean white Gaussian. In addition to $f_o$, both A and $\phi$ are also not known. Based on the Cramer-Rao Bound analysis, the minimum root-mean-square error in estimating $f_o$ is equal to:

$$\delta_m = \frac{F_s}{2\pi}\sqrt{\frac{12}{SNR \cdot L^3}} \text{ Hz} \tag{20}$$

where $F_s$ is the sampling frequency, SNR is the signal-to-noise ratio and L is the number of samples collected. For example, with $F_s = 10^6$ samples per second, SNR=3 dB and $L = 10^6$ samples, the acquisition error is $\epsilon_m = 0.4$ mHz. The acquisition error can be made smaller by collecting more samples.

It has been shown that simply locating the peak in the FFT magnitude of Equation (19) can achieve the optimum accuracy defined by Equation (20), if $f_o$ is not near 0 or $F_s/2$.

The DTD is the difference of two frequency measurements and the acquisition error in the DTD is $$\epsilon_{m,\Delta_{21}} = \delta_m(t_2) - \delta_m(t_1) \tag{21}$$

IV.2 Uplink Frequency Variation

The uplink frequency from the unknown emitter is in the order of Gigahertz. Due to the instability of an oscillator, the uplink frequency has variations typically in the order of Hz. This frequency drifting is negligible in satellite communications because the relative frequency variation with respect to the uplink frequency is insignificant. Since we are trying to observe the small Doppler created from the satellite motion, this amount of frequency variation could be significant contributing factor to the noise.

Figure 6:
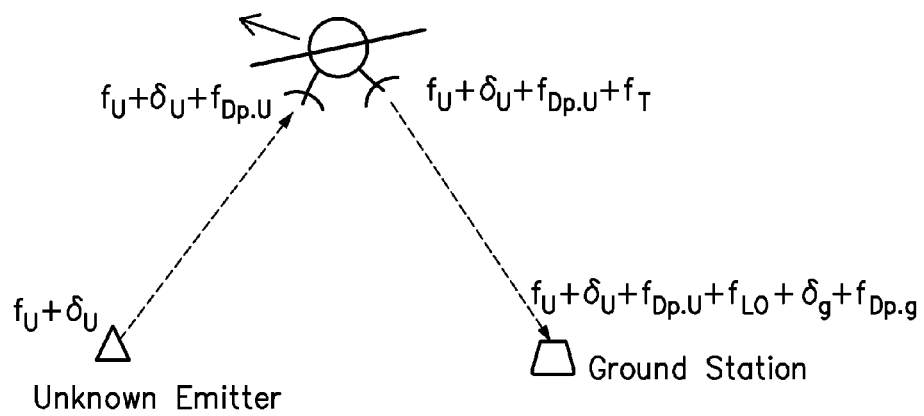
FIG. 6 illustrates propagation of the uplink and downlink frequency variations to the ground station in accordance with an embodiment of the present invention.

Let $\delta_u$ the uplink frequency variation from the unknown emitter. Similarly, let $\delta_g$ be the downlink frequency variation seen in the ground station. The transmitted frequency from the unknown emitter is $f_u + \delta_u$ and $\delta_u$ will go through the satellite to the ground station. Also, the downlink frequency variation $\delta_g$ will appear in the received frequency at the ground station. FIG. 6 shows the propagation of the frequency errors. For simplicity, we have denoted the Doppler frequency in the uplink path as $f_{Dp,u} = f_u v^T \rho_{u,s}/p$ and that in the downlink path as $f_{Dp,g} = f_{down} v^T \rho_{s,g}/p$. The observed frequency in the ground station at time t now becomes $$f_g(t) = \left(f_u + \frac{f_u}{p} v(t)^T \rho_{u,s(t)} + f_T\right) + \left(\frac{f_{down}}{p} v(t)^T \rho_{s(t_1),g}\right) + \delta_u(t) + \delta_g(t) \tag{22}$$

In the presence of a calibration emitter, the downlink path for the calibration emitter is the same as that of the unknown emitter and $\delta_g$ is removed after differential calibration. Using (22) into (16), when the uplink calibration frequency is well controlled without drifting, the noise in the observed unknown emitter frequency after differential calibration is $\delta_u$. The DTD is formed by the difference of two calibrated unknown emitter frequencies at two instances. Thus the noise component due to frequency variation in the DTD is $$\epsilon_{f,\Delta_{21}} = \delta_u(t_2) - \delta_u(t_1) \tag{23}$$

IV.3 Frequency Error from Residual Ephemeris Error

Let $\delta_{s(t)}$ and $\delta_{v(t)}$ be the satellite position and velocity error at time t. Also, let $P_{u,s}^\perp$ be the orthogonal projection matrix of $\rho_{u,s}$ defined as $$P_{u,s}^\perp = (I - \rho_{u,s} \rho_{u,s}^T). \tag{24}$$

Using the first-order analysis, it can be verified that the frequency error resulted from the satellite ephemeris error after differential calibration is given by $$\varepsilon_{s,\Delta 21} = \frac{f_u}{p}[(\rho_{u,s(t_2)} - \rho_{c,s(t_2)})^T \delta_{v(t_2)} - (\rho_{u,s(t_1)} - \rho_{c,s(t_1)})^T \delta_{v(t_1)}] + \qquad (25)$$

$$\frac{f_u}{p} v(t_2)^T \left( \frac{1}{\|u - s(t_2)\|} P^\perp_{u,s(t_2)} - \frac{1}{\|c - s(t_2)\|} P^\perp_{c,s(t_2)} \right) \delta_{s(t_2)} -$$

$$\frac{f_u}{p} v(t_1)^T \left( \frac{1}{\|u - s(t_1)\|} P^\perp_{u,s(t_1)} - \frac{1}{\|c - s(t_1)\|} P^\perp_{c,s(t_1)} \right) \delta_{s(t_1)}$$

Equation (25) indicates that the satellite position and velocity errors are multiplied by some factors depending on the locations of the unknown emitter and the calibration emitter. When the calibration emitter is near to the unknown emitter, the satellite position and velocity errors will cause little frequency error. In the special case when the calibration emitter is in the same location as the unknown emitter, the satellite position and velocity errors do not contribute to any frequency noise. It is therefore important to choose a calibration emitter location close to the unknown emitter. The closer they are, the smaller will be the frequency error caused by the ephemeris error.

Taking the noise into account, Equation (18) becomes $$\tilde{f}_{g,\Delta 21} = \frac{f_u}{p}(v(t_2)^T \rho_{u,s(t_2)} - v(t_1)^T \rho_{u,s(t_1)}) + n_{21}. \qquad (26)$$

The noise $n_{21}$ is the composite of the random variations of the frequency acquisition error, the transmitted frequency of the unknown emitter, and the residual error of the satellite ephemeris data after differential calibration. It is equal to $$n_{21} = \epsilon_{m,\Delta 21} + \epsilon_{f,\Delta 21} + \epsilon_{s,\Delta 21}. \qquad (27)$$

In Equation (27), $\epsilon_{m,\Delta 21}$ is in the order of Millihertz and it can be made small by increasing the number of samples. $\epsilon_{s,\Delta 21}$ can be reduced by choosing a calibration emitter close to the unknown emitter based on some initial position estimate of the unknown emitter. However, we have little control over $\epsilon_{f,\Delta 21}$ because it depends completely on the electronics of the unknown emitter. In fact, $\epsilon_{f,\Delta 21}$ is the dominating factor in Equation (27) and it is typically in the order of Hertz.

V. Frequency Measurement Approach

Highly accurate frequency measurements are necessary to measure the relatively small Doppler frequency offsets observed from signals transmitting across geostationary satellites. The Doppler frequency offset is induced by movement of the satellite and is often quite small due to the limited motion of geostationary satellites.

The single geostationary satellite geolocation technique using the DTD requires a very different acquisition approach than what has been previously disclosed for traditional multi-satellite geolocation. Prior techniques involve measuring the frequency difference between the interfering signal and a replica of this signal from an adjacent satellite. The single satellite geolocation approach requires measuring the absolute frequency offset of the interfering signal rather than the frequency difference between two versions of the same signal. Since the frequency offset must be measured over time, the absolute carrier frequency of the signal must be accurately extracted and measured. This is fairly straight-forward if the signal is a continuous wave (CW) signal, but much more complex if the signal is modulated. One of the main challenges of the single satellite geolocation approach over existing multi-satellite acquisition approaches is that the acquisition is more sensitive to the signal's modulation. In order to measure the absolute frequency of a modulated carrier, the system must first determine the signal's modulation and then perform an appropriate transform on the signal to accurately extract and measure the carrier frequency of the modulated signal.

The measurement approach described below works for both continuous wave (CW) and modulated signals. The acquisition approach is described in more detail in the following sections.

V.1 Frequency Acquisition System

Figure 7:
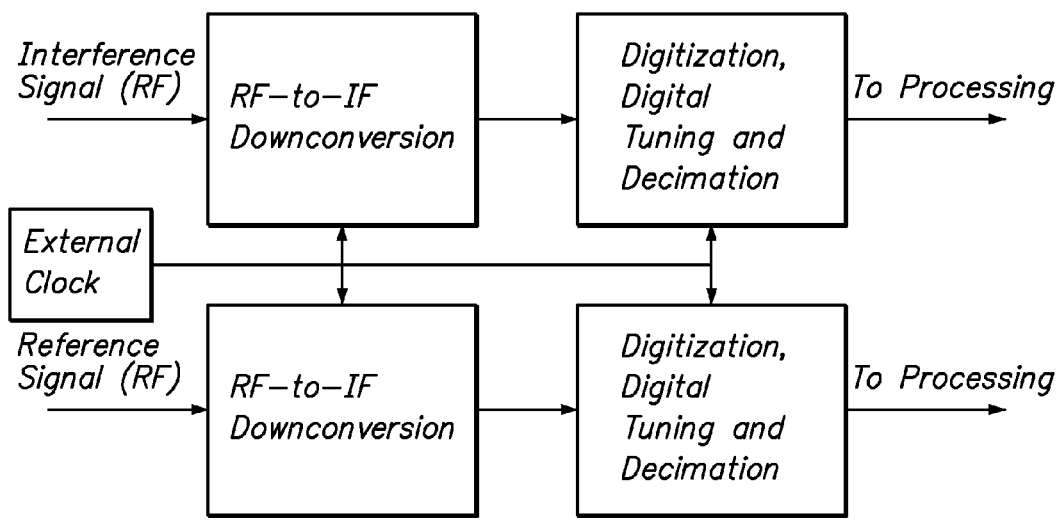
FIG. 7 illustrates a block diagram of frequency acquisition system in accordance with an embodiment of the present invention.

FIG. 7 shows a block diagram of the interface and hardware elements that comprise the Frequency Acquisition System. As shown in the figure, two parallel chains of hardware are used to synchronously acquire the interfering signal as well as a reference or calibration signal. Both signals are downconverted from an RF frequency to an IF frequency and then digitized. To ensure that the two chains are synchronous and phase locked, an external reference clock is fed to the downconversion and digitization elements. A very stable external reference clock should be used to minimize any potential clocking drifts in the downconverters and digitizers which may induce a bias in the frequency measurements.

The RF-to-IF downconversion and digitization are functions performed in hardware. The digital tuning and decimation functions can be performed in either hardware or software. The input to the frequency acquisition system is RF from a single antenna that is pointed to a particular satellite. The output of the acquisition system is complex baseband (I,Q) samples of the interferer and reference signals.

V.2 CW Signal Frequency Measurements

Figure 8:
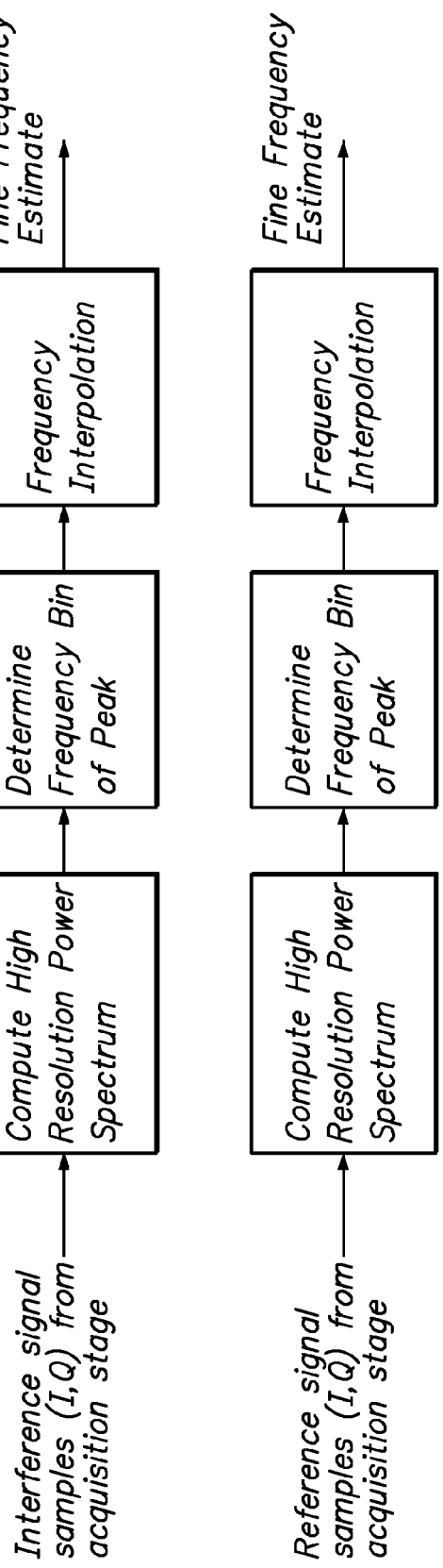
FIG. 8 illustrates a processing flow for measuring the carrier frequency of a continuous wave signal in accordance with an embodiment of the present invention.

FIG. 8 shows the processing flow for measuring the carrier frequency of a continuous wave (CW) signal. The IQ baseband samples from the acquisition stage are processed using a Fast Fourier Transform (FFT) to produce a power spectrum. The length of the FFT is determined by the required acquisition time and the sample rate of the data. The minimum root-mean-square error in estimating the frequency given a particular sample rate and FFT size is shown in Equation (20).

Once the power spectrum is computed, the frequency bin that contains the peak CW amplitude is identified. Since a CW signal is a pure sinusoid, most of its power will show up in a single frequency bin. The frequency of this bin represents the initial frequency estimate of the CW signal. In most cases the CW signal will not be located at the exact center of a frequency bin, which results in an estimation uncertainty proportional to the frequency bin size itself. This uncertainty can be significantly reduced by using the neighboring samples to produce a more accurate estimate of the true frequency. This process, known in the literature as interpolation, can produce a much finer frequency estimate. A SINC interpolation function is an example interpolator that can be used to produce a fine frequency estimate.

V.3 Modulated Signal Frequency Measurements

Figure 9:
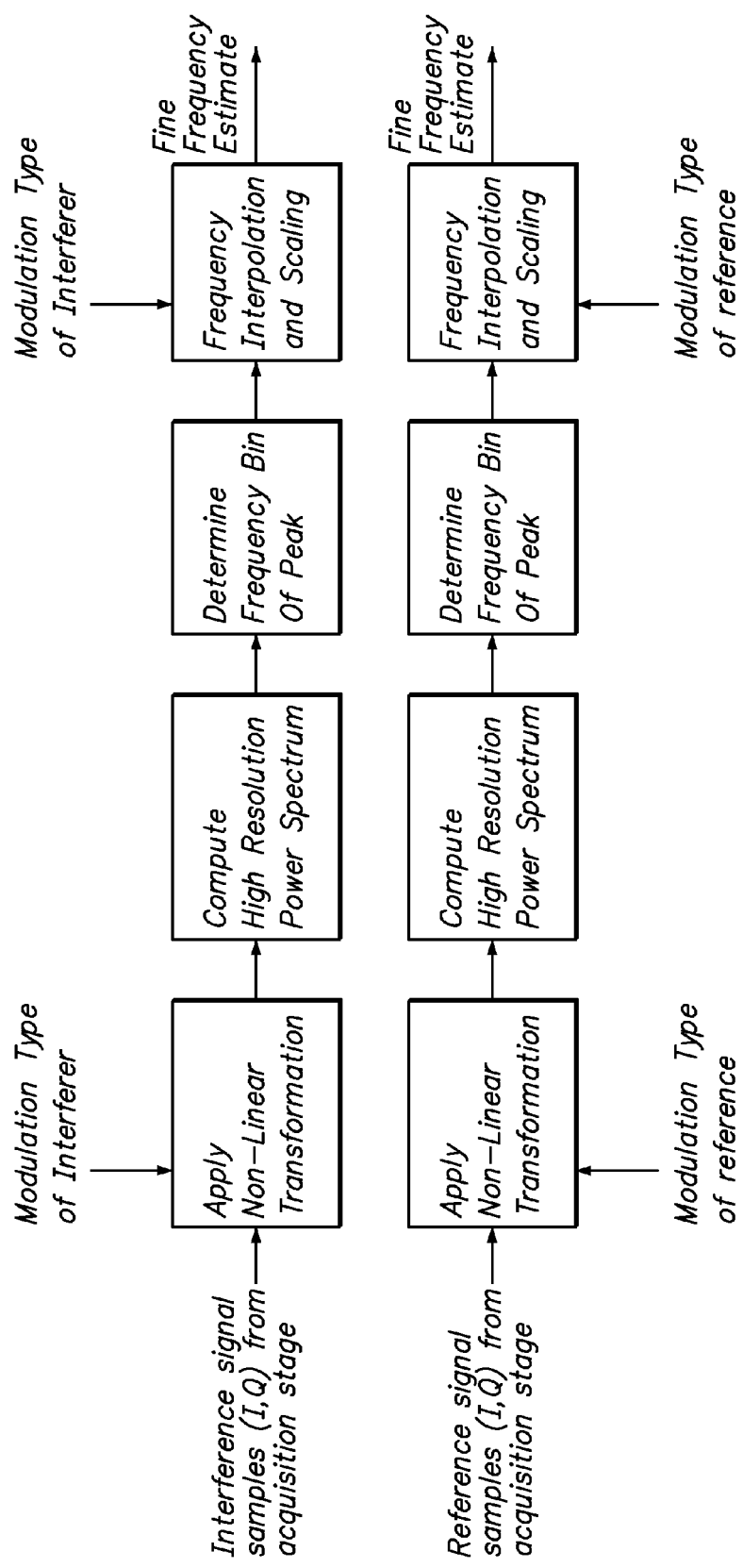
FIG. 9 illustrates a processing flow for measuring the carrier frequency of a modulated signal in accordance with an embodiment of the present invention.

FIG. 9 shows the processing flow for measuring the carrier frequency of a modulated signal. As described in the section above, estimating the carrier frequency of a CW signal is fairly straight-forward and very accurate. The technique used here is to transform the modulated signal such that it can be measured similarly to a CW signal. This technique makes use of the cyclostationary nature of digital signals to recover the carrier frequency for direct measurement. For example, the transformation to recover the carrier of a BPSK signal is to square the input IQ samples. As an example, assume x(n) represents the input IQ samples for a BPSK modulated signal, then $x^2(n)$ represents the transformed waveform used to extract the carrier frequency. Once the appropriate transformation is applied, the modulated signal can be processed similarly to the CW signal. One difference in the processing with a modulated carrier is that the fine frequency estimate must be scaled. For example, once the BPSK fine carrier offset estimate is determined, this estimate must be divided by 2 to compensate for the squaring operation. This relationship is well known from the mathematics of convolution.

Table 1 below shows a partial list of some of the most common modulations used in satellite communications along with the appropriate transform and frequency scaling.

TABLE 1

Partial List of Common Satellite Modulations and Transformations

| Modulation Type | Input Signal | Transformed Signal | Fine Frequency Offset Scaling Factor |
|---|---|---|---|
| BPSK | x(n) | $x^2(n)$ | 0.5 |
| QPSK | x(n) | $x^4(n)$ | 0.25 |
| 8 PSK | x(n) | $x^8(n)$ | 0.125 |
| 8 QAM | x(n) | $x^2(n)$ | 0.5 |
| 16 QAM | x(n) | $x^4(n)$ | 0.25 |

VI. Obtaining Unknown Emitter Position

As shown in Equation (26), random noise appears in the DTD. The random noise increases the geolocation error. The approach to mitigate the large frequency error is to make use of multiple (more than 2) measurements. This is because the unknown emitter location is fixed while the noise is random and is independent from measurement to measurement. Obtaining the unknown emitter location using multiple measurements will reduce the effect of random noise. Generally speaking, the geolocation error is inversely proportional to some function of the square-root of N, where (N+1) is the number of measurements used for geolocation.

Let us assume that we have (N+1) calibrated frequency measurements $\tilde{f}_g(t_i)$, i=1, 2, ..., N+1, among which (N+1)N/2 DTDs can be formed. All DTDs or a subset of them can be used to obtain the unknown emitter position. For simplicity purpose of elaboration, we consider the subset of the DTDs $\tilde{f}_{g,\Delta_{i1}}$, i=2, ..., N+1. We would like to find an estimate of u from $\tilde{f}_{g,\Delta_{i1}}$.

Two approaches will be given. The first approach solves for the individual solutions and then combining them to derive the final estimate. The second approach uses the Maximum Likelihood (ML) method and obtains the unknown emitter location using all N DTDs simultaneously.

VI.1 Combining Individual Solutions

For every combination of two DTDs, we shall use the Taylor-series linearization method to obtain a solution of the unknown emitter location. Note that there are a total of (N−1)N/2 individual solutions.

The Taylor-series method uses an initial solution guess $\hat{u}^{(0)}$ to expand $\rho_{u,s}$ in (26) and maintains only up to the linear term in the expansion. The linearized equation is then used to compute the correction term $\delta\hat{u}^{(0)}$ to improve the solution.

The Taylor-series method computes the solution by iterating the following two equations for k=0, 1, ... until $\|\delta\hat{u}^{(k)}\|$ is less than some pre-determined small value:

$$\delta\hat{u}^{(k)} = \begin{bmatrix} \left(\frac{v(t_i)^T P^\perp_{\hat{u}^{(k)},s(t_i)}}{\|\hat{u}^{(k)} - s(t_i)\|} - \frac{v(t_1)^T P^\perp_{\hat{u}^{(k)},s(t_1)}}{\|\hat{u}^{(k)} - s(t_1)\|}\right) \\ \left(\frac{v(t_j)^T P^\perp_{\hat{u}^{(k)},s(t_j)}}{\|\hat{u}^{(k)} - s(t_j)\|} - \frac{v(t_1)^T P^\perp_{\hat{u}^{(k)},s(t_1)}}{\|\hat{u}^{(k)} - s(t_1)\|}\right) \\ 2\hat{u}^{(k)T} \end{bmatrix}^{-1}$$

$$\begin{bmatrix} \frac{p}{f_u}\tilde{f}_{g,\Delta_{i1}} - \left(v(t_i)^T \rho_{\hat{u}^{(k)},s(t_i)} - v(t_1)^T \rho_{\hat{u}^{(k)},s(t_1)}\right) \\ \frac{p}{f_u}\tilde{f}_{g,\Delta_{j1}} - \left(v(t_j)^T \rho_{\hat{u}^{(k)},s(t_j)} - v(t_1)^T \rho_{\hat{u}^{(k)},s(t_1)}\right) \\ r^2 - \|\hat{u}^{(k)}\|^2 \end{bmatrix}$$

$$\hat{u}^{(k+1)} = \hat{u}^{(k)} + \delta\hat{u}^{(k)}, \quad (28)$$

where $P^\perp_{u,s}$ is defined in (24) and r is the expected distance from the earth center to the unknown emitter. The above equation uses the two DTD measurements $\tilde{f}_{g,\Delta_{i1}}$ and $\tilde{f}_{g,\Delta_{j1}}$. We shall generate all possible solutions for all or a subset of combinations of (i,j), $2 \leq i < j \leq N+1$ and denote them as $\hat{u}_m$, m=1, 2, ..., M.

$\hat{u}_m$ is next converted to the latitude and longitude pair $(lat_m, lon_m)$. To remove possible outliers, we sort $lat_m$ and discard the values in certain lower and upper percentiles. A weighted average is then applied to the remaining values to form the latitude estimate of the emitter. The same processing applies to $lon_m$ in generating the longitude estimate of the emitter.

VI.2 ML Solution

The ML solution is obtained by exhaustive search over the latitude and longitude of the possible positions of the unknown emitter. For a trial latitude and longitude pair that is denoted by the subscript n, we shall perform the following steps:

(i) Convert the latitude and longitude pair to the position in Cartesian coordinates and denote it as $\hat{u}_n$, (ii) For i=2, 3, ..., N+1, compute $$\varepsilon_{n,i} = \frac{p}{f_u}\tilde{f}_{g,\Delta_{i1}} - \left(v(t_i)^T \rho_{\hat{u}_n,s(t_i)} - v(t_1)^T \rho_{\hat{u}_n,s(t_1)}\right) \quad (29)$$

(iii) Obtain the cost for trial solution n as $$\xi_n = \sum_{i=2}^{N+1} w_i(\varepsilon_{n,i})^2 \quad (30)$$

where $w_i$ are the weights.

The weights $w_i$ can be designed based on the noise level in $\tilde{f}_{g,\Delta_{i1}}$ so that large noise will give smaller weights.

The unknown emitter location estimate is the trial location that gives the minimum value of $\xi_n$.

VII. Sequential Solution for Unknown Emitter

The frequency measurements are made sequentially and it is useful to update the unknown emitter position as new frequency measurements are acquired, rather than collecting a large number of frequency measurements before producing a solution. We shall describe several strategies below to generate a sequential solution update of the unknown emitter location.

VII.1 Method-1

A first method (Method-1) always uses the first frequency measurement as the reference to compute the DTD. Up to time instant i−1, we have the solution estimate of the unknown emitter, $\hat{u}_{i-1}$. When a new frequency measurement is observed at instant i, the DTD between the frequency measurements at instants i and 1, $\tilde{f}_{g,\Delta_{i1}}$ can be obtained. The following steps will be used to generate the updated unknown emitter location:

(i) Compute the (i−1) individual solutions using (28) by pairing $\tilde{f}_{g,\Delta_{i1}}$ with $\tilde{f}_{g,\Delta_{k1}}$, k=2, 3, . . . , i−1, and denote these individual solutions as $\hat{v}_{i,k}$.

(ii) Obtain a weigthed average of $\hat{v}_{i,k}$ to produce a single solution estimate:

$$\hat{v}_i = \sum_{k=2}^{i} w_k \hat{v}_{i,k} \qquad (31)$$

where $w_k$ are the weights. There are many criteria to choose $w_k$. One choice is to make the weights proportional to a function of the intersection angle between the two DTDs formed by $\tilde{f}_{g,\Delta_{ij}}$ and $\tilde{f}_{g,\Delta_{kl}}$. The intersection angle of two DTDs is defined here as the smaller angle at their intersection point. Another choice could be to select the weights inversely proportional to the noise levels in $\tilde{f}_{g,\Delta_{i1}}$ and $\tilde{f}_{g,\Delta_{k1}}$. Note that the weights can also be selected to be a combination of several criteria, such as proportional to the intersection angle and inversely proportional to the noise level.

(iii) Generate the final solution estimate $\hat{u}_i$ at the current instant i by combining $\hat{u}_{i-1}$ and $\hat{v}_i$:

$$\hat{u}_i = h_1 \hat{u}_{i-1} + h_2 \hat{v}_i \qquad (32)$$

where $h_1$ and $h_2$ are another set of weights proportional to the accuracy of $\hat{u}_{i-1}$ and $\hat{v}_i$ respectively.

This sequential update procedure only requires the computation of (i−1) solutions in instant i. The final estimate $\hat{u}_i$ contains the solutions of all possible pairings of $\tilde{f}_{g,\Delta_{k1}}$, k=2, 3, . . . , i.

VII.2 Method-2

A second method (Method-2) follows the same process as in Method-1. To avoid possible outliers that will dilute the accuracy of the final solution estimate, only the few solutions with the largest intersection angles will be used in the weighted average process in Equation (31).

VII.3 Method-3

A third method (Method-3) computes one solution only when a new frequency measurement is observed. This method will have a computational advantage when computational resources are limited. At time instant i the new frequency measurement is $\tilde{f}_g(t_i)$. We shall use the previous frequency measurement $\tilde{f}_g(t_j)$ to form the DTD with $\tilde{f}_g(t_i)$ as $\tilde{f}_{g,\Delta_{ij}}$, where j is selected such that $$t_j = \begin{cases} t_i - H, & t_i - H > t_2 \\ t_2, & \text{otherwise.} \end{cases} \qquad (33)$$

H in Equation (33) represents the time separation in generating the DTD. To generate a solution we select the other DTD as $\tilde{f}_{g,\Delta_{kl}}$, where k is such that $$t_k = t_i - \tilde{H} \qquad (34)$$

and $$l = j - 1. \qquad (35)$$

H and $\tilde{H}$ are some selected values.

The solution $\hat{v}_i$ is obtained from $\tilde{f}_{g,\Delta_{ij}}$ and $\tilde{f}_{g,\Delta_{kl}}$ using the method in VI.1. The final solution estimate is generated from (32), where the weights are expected to be $$h_1 = \left(\frac{i-3}{i-2}\right), h_2 = \left(\frac{1}{i-2}\right) \qquad (36)$$

when $t_i$−H in (33) is not less than $t_2$. When it is less than $t_2$, a larger $h_2$ value is preferred and $h_1 = 1 - h_2$.

VIII. Number of Measurements Needed

In most of the solution methods described in the previous sections, the theoretical mean-square localization error can be evaluated. In practice, it is desirable to produce the best geolocation accuracy in the least amount of time. The number of required measurements can be computed based on the expected localization error from the solution method that is used. The number of measurements required will dictate the total collection time required to produce the desired accuracy. Please see the example in Section X for more illustration.

IX. Processing Considerations

IX.1 Frequency Segment Based Processing

Figure 10:
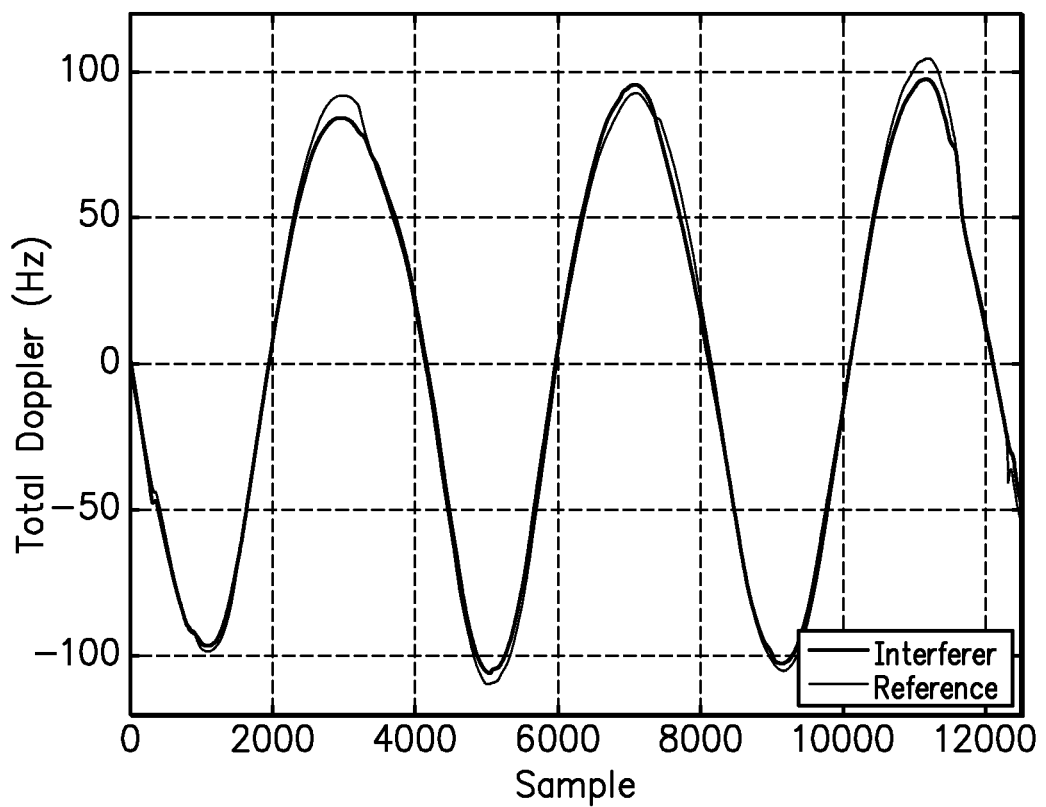
FIG. 10 illustrates variations in Doppler frequency measurements for two signal sources that are co-located in accordance with an embodiment of the present invention.

Under some conditions it may be necessary to process the frequency measurements in segments, where each segment consists of a plurality of frequency measurements which may be collected over several hours. This is because various effects, such as poorly reference-locked transmit equipment, can cause undesirable slow variations and drifting in the frequency measurements. FIG. 10 shows the Doppler frequency measurements obtained from two different modems (denoted by interferer and reference) that are located at the same position on earth. Each of the two modems transmits a digitally modulated signal that is received by a single satellite. The satellite relays the two signals to a ground station which produces the Doppler frequency measurements. Although the two signals come from the same location and they travel the same propagation path, there are small variations between the two Doppler frequency trajectories. The observed variations in the Doppler frequency measurements occur because the transmit equipment is not completely phase locked to a standard reference. These variations are significant enough to degrade the geolocation result if the data is processed together for the entire collection. However, breaking the processing up into discrete segments and excluding data where the frequency measurements include drifting or oscillations caused by the transmit equipment can significantly improve the accuracy under these conditions.

FIG. 10 illustrates variations in Doppler frequency measurements for two signal sources that are co-located. Referring to FIG. 10, it can be seen that the Doppler frequency measurements of the interferer and the reference tend to diverge where the measurements change from increasing to decreasing (e.g. between approximately sample nos. 2300 and 3200) and where the measurements change from decreasing to increasing (e.g. between approximately sample nos. 4800 and 5200). Conversely, there is little divergence where the measurements are steadily increasing (e.g. between approximately sample nos. 1500 and 2200) and where the measurements are steadily decreasing (e.g. between approximately sample nos. 3200 and 4800).

IX.2 Computation Interval

Figure 11:
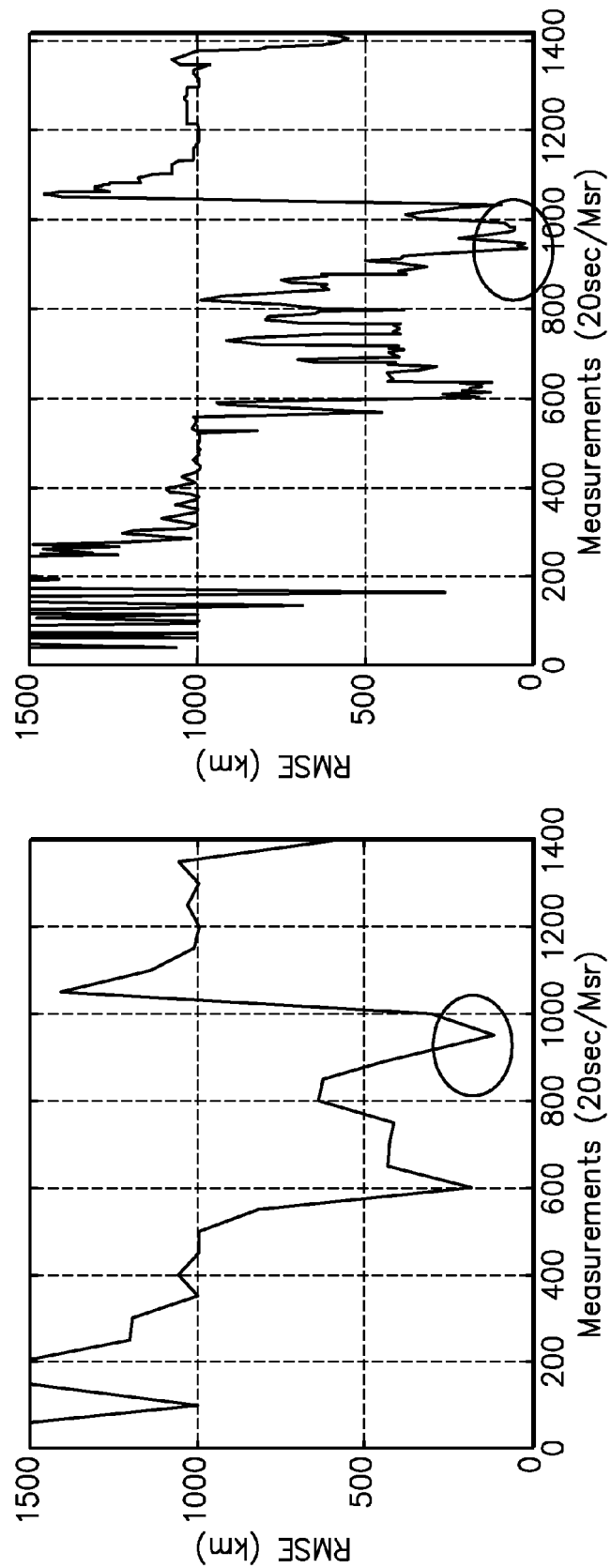
FIGS. 11A-B illustrate geolocation accuracy with respect to the number of measurements used to compute the solution in accordance with an embodiment of the present invention.

It has been observed that the geolocation can be improved if the solution is computed for every new frequency measurement collected. The geolocation accuracy may vary considerably with respect to the number of measurements used to compute the solution. It is not necessarily true that using more data will yield better performance. The geolocation solution should be computed for every new additional measurement collected in order to capture the best solution. FIG. 11A shows the root mean-square error (RMSE) of geolocation when the solution is computed for every 50 additional measurements and FIG. 11B gives the RMSE when it is obtained for every additional measurement. It is clear that computing the solution after every new measurement produces a more accurate solution, as indicated by the circled regions in the figures.

IX.3 Identifying the Converged Solution

Figure 12:
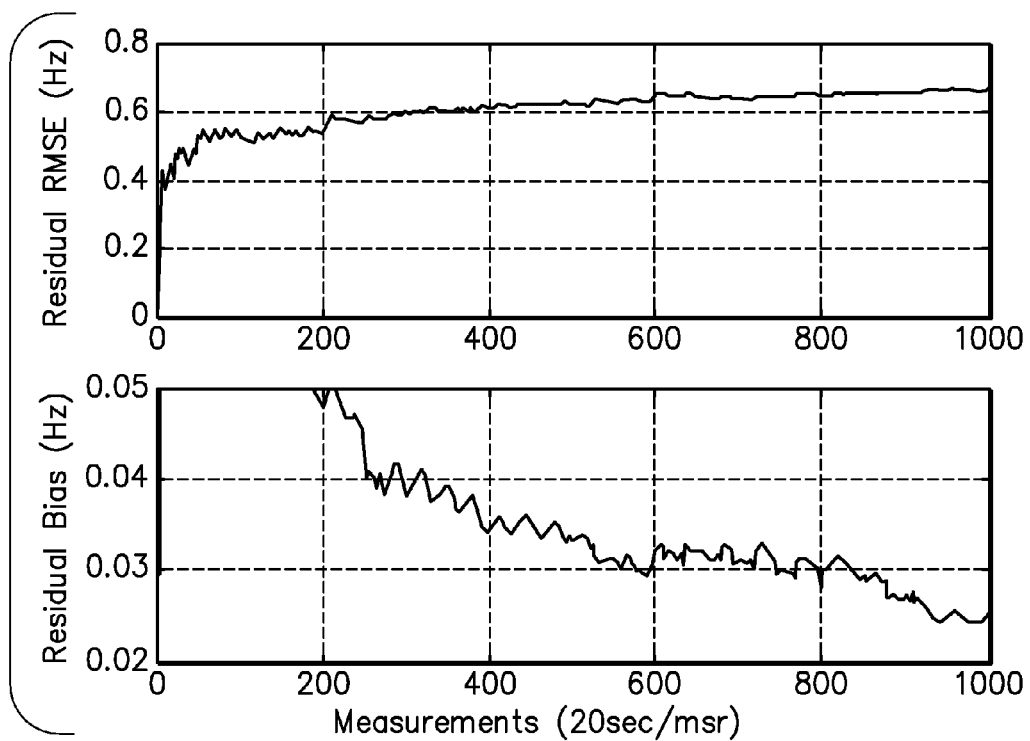
FIG. 12 illustrates plots of root mean square error (RMSE) and bias of frequency residual in accordance with an embodiment of the present invention.
Figure 13:
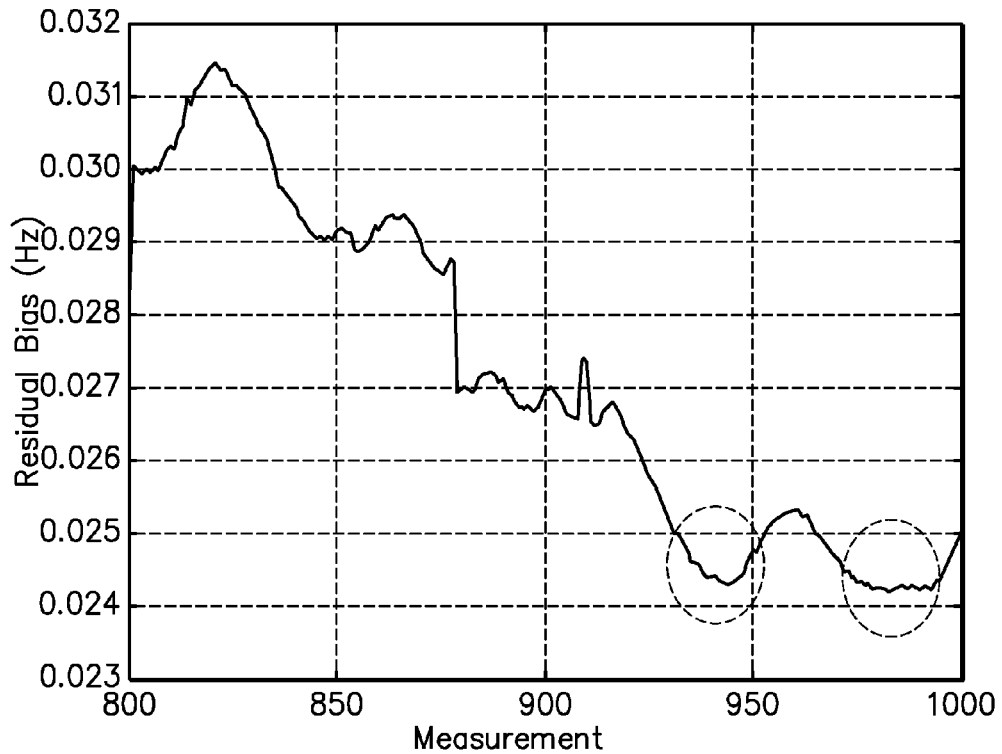
FIG. 13 illustrates behavior of residual bias between 800 and 1000 measurements in accordance with an embodiment of the present invention.
Figure 14:
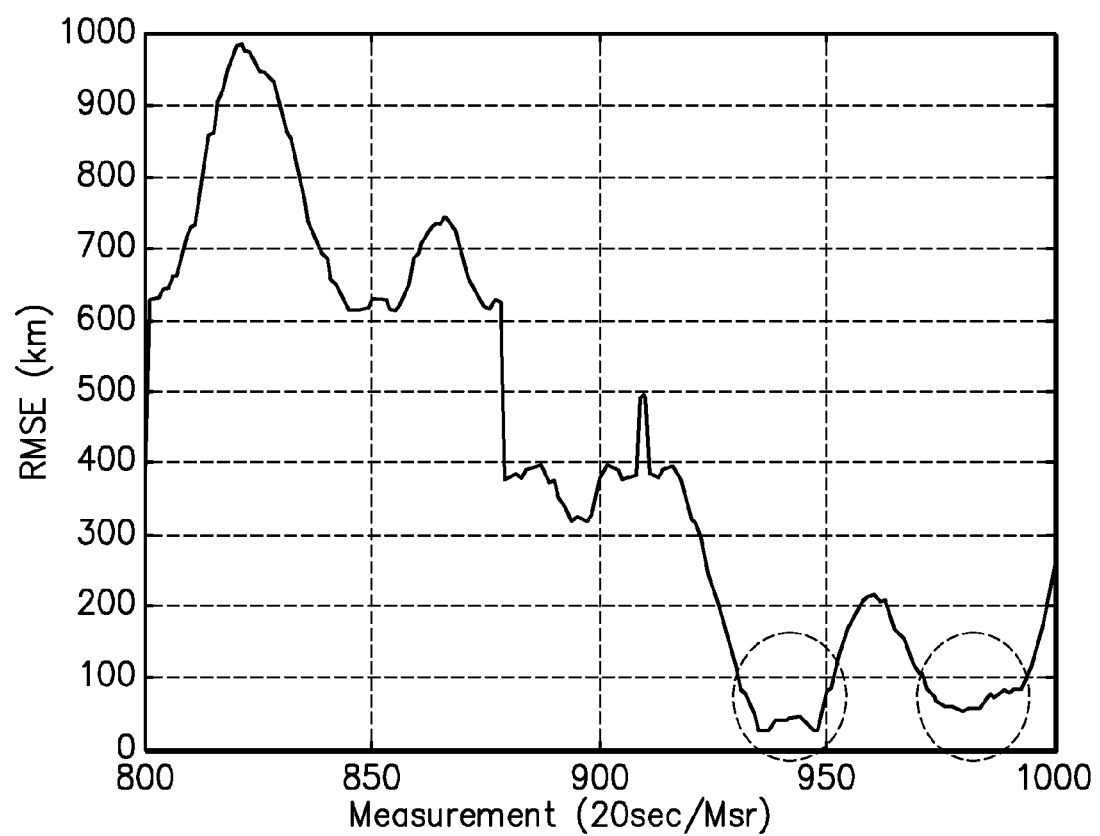
FIG. 14 illustrates geolocation RMSE between 800 and 1000 measurements in accordance with an embodiment of the present invention.

The residual RMSE and the residual bias computed from the difference between the measured Doppler frequency and the reproduced frequency from the obtained geolocation solution can identify when a solution with good accuracy occurs. FIG. 12 shows the RMSE and bias plots. As the number of measurements increases, the RMSE settles to a constant value while the bias decreases with some variation. FIG. 13 shows the behavior of the residual bias and FIG. 14 shows the behavior of the geolocation RMSE over the same measurement window. There is a very high correlation between the variations in the residual bias and the geolocation RMSE. In particular, the smaller bias regions correspond to where the better geolocation results occur. This is a very significant result as it demonstrates that the residual bias can be used to help in determining convergence of the solution. The geolocation RMSE is the best metric, however, it is not practical in practice, since it requires knowing the true location of the emitter to compute the result.

IX.4 Combining Solutions for Improved Accuracy

It has been observed with measurement data from various satellites that using the segment of upward Doppler frequency measurements may give better geolocation accuracy for the latitude of an emitter while using the downward Doppler frequency segment may provide better accuracy for the longitude, or vice versa. FIG. 10 shows Doppler frequency measurements where segments of upward Doppler frequency measurements correspond to portions of the waveform where the Doppler frequency shift is increasing (e.g. between approximately sample nos. 1000 and 3000), and where segments of downward Doppler frequency measurements correspond to portions of the waveform where the Doppler frequency shift is decreasing (e.g. between approximately sample nos. 3000 and 5000). FIG. 15 shows an example where the two crosses (or x's) denote the two geolocation estimates from the upward segment and the downward segment, and the triangle represents the true emitter location. By taking the latitude estimate from one solution and the longitude estimate from the other, the geolocation accuracy can be significantly enhanced.

X. Application to Multiple Satellite Scenarios

The disclosed single geolocation technique here can be used in conjunction with the existing geolocation systems that use at least two satellites. In particular, the DTD solution can be combined with the TDOA-TDOA, TDOA-FDOA and FDOA-FDOA solutions to obtain a better emitter location estimate. Alternatively, the LOP created from a single DTD can be used to intersect the LOPs from TDOA and/or FDOA to form the emitter location estimate.

XI. An Illustrative Example

We shall consider the localization of an unknown emitter at (lat=40.7697°, lon=−73.9912°) using a single geostationary satellite. The location of the ground receiving station is at (lat=37.396°, lon=−122.105°) and the position of the calibration emitter is (lat=39.5992°, lon=−77.7547°). The geostationary satellite has an anticlockwise motion pattern as shown in FIG. 16A over 24 hours and the satellite speed over a 24-hour period is given in FIG. 16B. The motion and velocity of the satellite used in this example is from real ephemeris data.

In the DTD frequency measurement error (27), the standard deviation of the acquisition error is $\epsilon_{m,\Delta_{21}}$=100 mHz. The standard deviation of the satellite position error is 5 km in each coordinate and that of the velocity error is 0.02 m/s in each coordinate.

Figure 17:
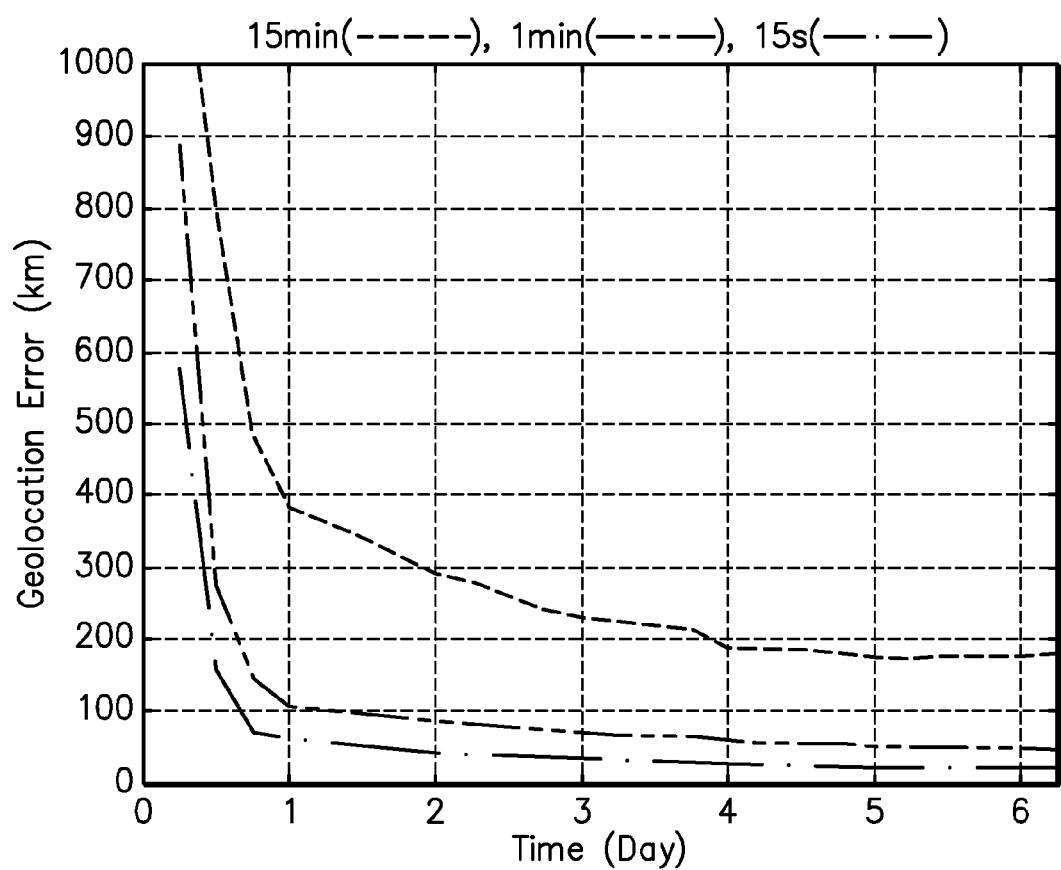
FIG. 17 illustrates geolocation accuracy using the ML solution at different data collection intervals in accordance with an embodiment of the present invention.

FIG. 17 shows the localization accuracy of the unknown emitter at different data collection intervals, where the ML solution technique as described in this document is used. In FIG. 17, the standard deviation of the error from uplink frequency variation is $\epsilon_{f,\Delta_{21}}$=10 Hz. The data collection intervals are 15 min, 1 min. and 15 sec. Over 1 day, the three collection intervals give 96, 1440 and 5960 measurements. Thus, decreasing the data collection interval effectively increases the number of measurements and thereby improving the geolocation accuracy.

In this example, if the desirable accuracy is less than 100 km error, we shall achieve this performance after ¾ of a day when the measurement interval is 15 sec. If the interval is 1 min, this performance is reached after 1 day.

FIG. 18 gives the results if the standard deviation of the error due to uplink frequency variation reduces to $\epsilon_{f,\Delta_{21}}$=2 Hz. In this case, a much better result is obtained. After 1 day, the localization error at 15 min., 1 min. and 15 sec. data collection intervals are 75 km, 20 km and 13 km.

Indeed, it can be shown that the geolocation error is directly proportional to the composite frequency error $n_{21}$. The results in FIG. 18 are roughly equal to those in FIG. 17 when decreasing the geolocation error by a factor of 5, because $\epsilon_{f,\Delta_{21}}$ is 5 times smaller.

We repeat the experiment under the same error settings as in FIG. 18, but using the geostationary satellite motion as shown in FIG. 19. The motion is not circular over 24 hours and the speed has larger variations with the maximum value of 3 m/s and the minimum value of about 1 m/s.

Figure 20:
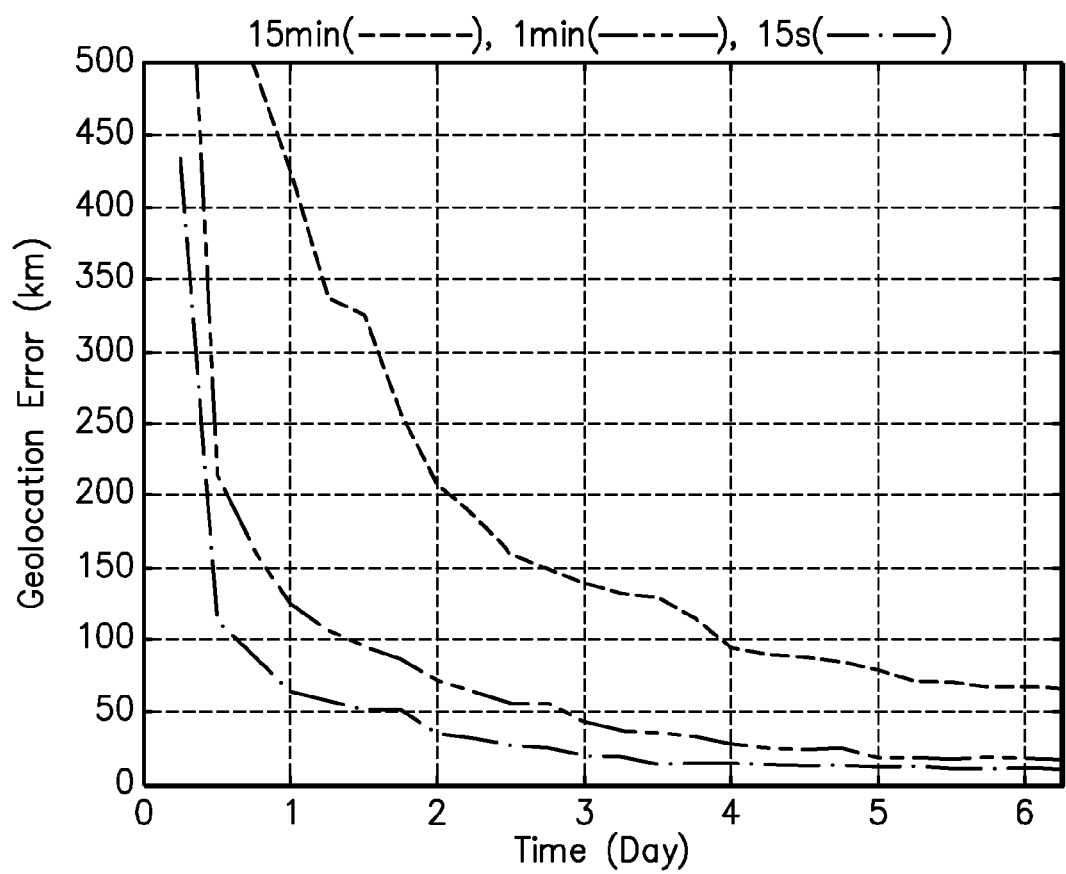
FIG. 20 illustrates geolocation accuracy using the ML solution at different data collection intervals in accordance with an embodiment of the present invention.

The results are shown in FIG. 20 for this case when $\epsilon_{f,\Delta_{21}}$=2 Hz. The accuracy is not as good as in the previous example (FIG. 18), although both cases have the same frequency error settings. The results indicate that the geolocation accuracy depends not only on the amount of frequency error, but also on the trajectory of the geostationary satellite used for geolocation.

Figure 21:
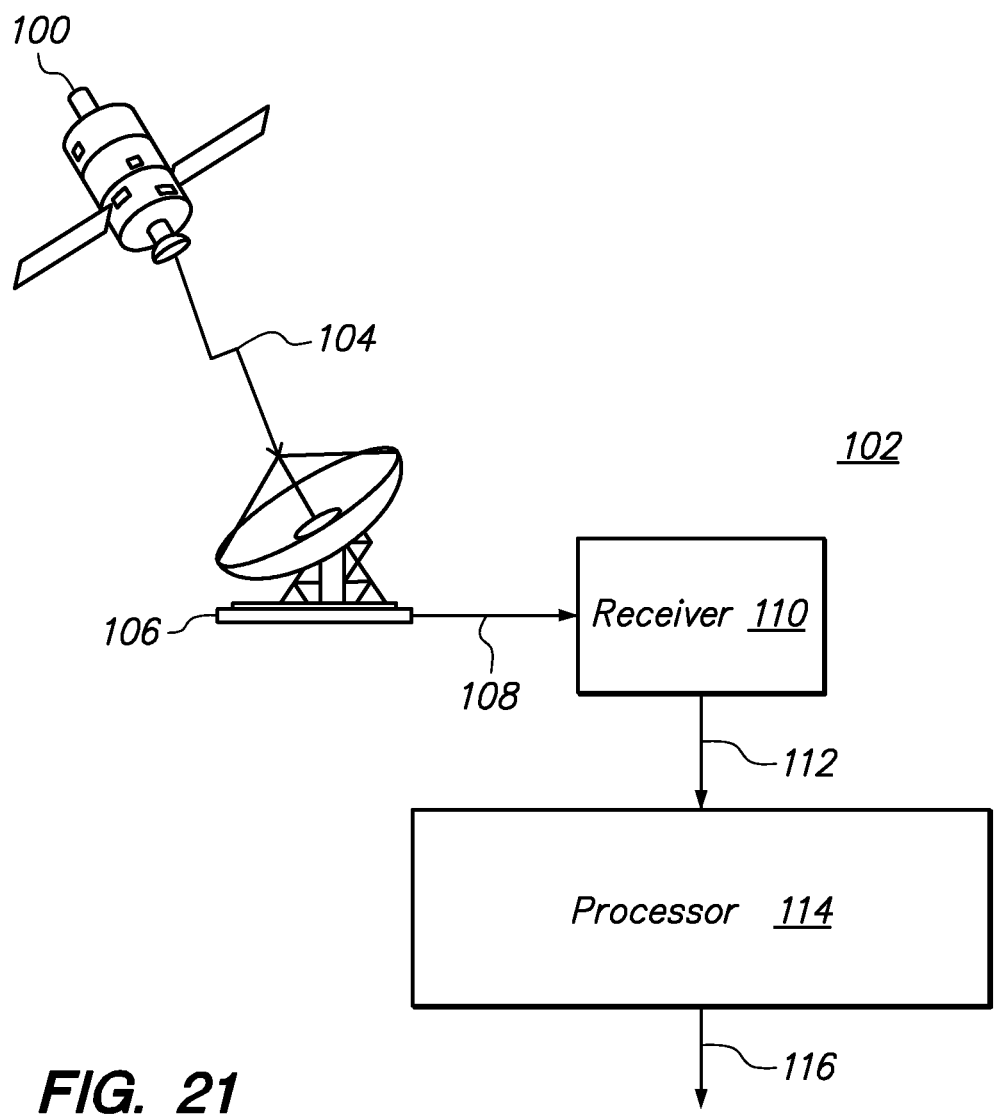
FIG. 21 illustrates a geostationary satellite together with an exemplary ground station that may be employed to estimate the position of an unknown emitter in accordance with an embodiment of the present invention.

As described above, a signal is received at a ground station which processes the received signal to estimate the position of the unknown emitter. FIG. 21 illustrates a geostationary satellite 100 together with an exemplary ground station 102 that may be employed to estimate the position of an unknown emitter in accordance with an embodiment of the present invention. Referring to FIG. 21, the satellite 100 relays a signal 104 that is received by a satellite antenna 106. A signal 108 from the antenna 106 is passed to a receiver 110. The receiver 110 may pass a processed version of the received signal 112 and/or other information derived from the received signal to a processor 114. The receiver 110 may perform such operations as determining an observed frequency for signals received by the satellite 100 from the unknown emitter and from a calibration emitter. This frequency information may then be provided to the processor 114. The processor 114 may receive additional information such as satellite ephemeris data. The processor 114 may then determine DTD and LOP based on the received signal. The processor 114 may also determine a calibration factor C and perform other operations described in this document.

An output from the processor 114 includes an estimate of the location of an unknown emitter. This information may be displayed by a display, transmitted to another location and/or saved for later use. Additionally, in response to the estimated location, appropriate action may be taken to mitigate effects of the unknown emitter, such as turning the emitter off or changing its transmit frequency.

The receiver 110 and the signal processor 114 are each implemented with hardware circuits and may also include related software that controls at least a portion of the hardware. While received signals are being processed, at least portions and/or properties of the signals can be at least temporarily stored in the hardware circuitry that performs the signal processing steps. Additionally, the ephemeris data and calibration factor discussed herein may also be at least temporarily stored in the hardware.

The description above illustrates operation of embodiments of the invention and is not meant to limit the scope of the invention. It will be apparent to one skilled in the relevant art that variations will be encompassed by the spirit and scope of the invention and that the invention may be practiced in other embodiments. The particular division of functionality between the various system components described herein is merely exemplary. Thus, the methods and operations presented herein are not inherently related to any particular computer or other apparatus. Functions performed by a single system component may instead be performed by multiple components, and functions performed by multiple components may instead performed by a single component. It will also be apparent that process steps described herein can be embodied in software, firmware or hardware. Thus, the present invention or portions thereof may be implemented by apparatus for performing the operations herein. This apparatus may be specially constructed or configured, such as application specific integrated circuits (ASICs) or Field Programmable Gate Arrays (FPGAs), as a part of an ASIC, as a part of FPGA, or it may comprise a general-purpose computer selectively activated or reconfigured by a computer program stored on a computer readable medium that can be accessed and executed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, or any type of media suitable for storing electronic instructions, and or coupled to a computer system bus. Furthermore, the methods described in the specification may be implemented by a single processor or be implemented in architectures employing multiple processor designs for increased computing capability. Accordingly, the disclosure of the present invention is intended to be illustrative, but not limiting, of the scope of the invention.

What is claimed is:

1. A method of determining the transmit location of an emitter using a single geostationary satellite, the method comprising:
   receiving a signal from the emitter and relayed by the geostationary satellite, the signal being received at a ground station at first and second time instances;
   determining a first line of position based on a first difference in frequency for the received signal between the first and second time instances;
   receiving the signal from the emitter and relayed by the geostationary satellite, the signal being received at the ground station at third and fourth time instances;
   determining a second line of position based on a second difference in frequency for the received signal between the third and fourth time instances; and
   determining the transmit location of the emitter based on the first line of position and the second line of position.

2. The method according to claim 1, wherein the geostationary satellite is moving in a first direction during the first and second time instances and wherein the satellite is moving in a second direction, different from the first direction, during the third and fourth time instances.

3. The method according to claim 1, wherein the signal from the emitter and relayed by the geostationary satellite has a first observed frequency at the first time instance and a second observed frequency at the second time instance and further wherein the signal from the emitter and relayed by the geostationary satellite has a third observed frequency at the third time instance and a fourth observed frequency at the fourth time instance.

4. The method according to claim 3, further comprising, further comprising determining the difference in frequency for each combination of time instances and applying Taylor-series linearization or maximum likelihood for determining the transmit location of the emitter.

5. The method according to claim 3, further comprising:
   receiving a signal from a calibration emitter and relayed by the geostationary satellite, the calibration emitter having a known transmit location and the signal from the calibration emitter having a first observed calibration frequency at a first calibration time instance;
   determining a first calibration factor from the first observed calibration frequency;
   subtracting the first calibration factor from the first observed frequency to form a first calibrated frequency;
   receiving the signal from the calibration emitter and relayed by the geostationary satellite, the calibration emitter having a second observed calibration frequency at a second calibration time instance;
   determining a second calibration factor from the second observed calibration frequency; and
   subtracting the second calibration factor from the second observed frequency to form a second calibrated frequency.

6. The method according to claim 5, further comprising using the first calibrated frequency and the second calibrated frequency for determining the first line of position.

7. The method according to claim 5, wherein the first time instance and the first calibration time instance are at the same time and wherein the second time instance and the second calibration time instance are at the same time.

8. The method according to claim 6, wherein the signal from the calibration emitter has a third observed calibration frequency at a third calibration time instance and a fourth calibration frequency at a fourth calibration time instance, and further comprising:
   determining a third calibration factor from the third observed calibration frequency;
   subtracting the third calibration factor from the third observed frequency to form a third calibrated frequency;
   determining a fourth calibration factor from the fourth observed calibration frequency; and
   subtracting the fourth calibration factor from the fourth observed frequency to form a fourth calibrated frequency.

9. The method according to claim 8, further comprising using the third calibrated frequency and the fourth calibrated frequency for determining the second line of position.

10. The method according to claim 9, wherein the third time instance and the third calibration time instance are at the same time and wherein the fourth time instance and the fourth calibration time instance are at the same time.

11. The method according to claim 1, wherein the signal from the emitter and relayed by the geostationary satellite comprises a modulated carrier.

12. The method according to claim 11, wherein a first observed frequency is determined by determining the modulation of the modulated carrier, applying a transform to the modulated carrier and estimating the frequency of the modulated carrier.

13. The method according to claim 12, wherein said estimating frequency of the modulated carrier is performed by computing a power spectrum of the transformed modulated carrier, identifying a frequency bin that contains a peak amplitude and performing interpolation to estimate the frequency of the modulated carrier.

14. The method according to claim 1, wherein the signal from the emitter and relayed by the geostationary satellite comprises a continuous wave signal.

15. The method according to claim 14, wherein a first observed frequency is determined by computing a power spectrum of the continuous wave signal, identifying a frequency bin that contains a peak amplitude and performing interpolation to estimate the frequency of the continuous wave signal.

16. The method according to claim 1, further comprising determining a third line of position from a time difference of arrival or a frequency difference of arrival obtained from two or more satellites and wherein said determining the transmit location of the emitter is based on the first line of position, the second line of position and the third line of position.

17. A method of determining the transmit location of an emitter using a single geostationary satellite, the method comprising:
receiving a signal from the emitter and relayed by the geostationary satellite, the signal being received at a ground station at a plurality of time instances and having a plurality of observed frequencies, one for each time instance;
determining a plurality of lines of position based on the plurality of observed frequencies; and
determining the transmit location of the emitter based on at least one intersection among the plurality of lines of position.

18. The method according to claim 17, wherein the geostationary satellite is moving in different directions during observation of frequencies used for determining the transmit location of the emitter.

19. The method according to claim 18, wherein latitude of the emitter is determined using observed frequencies obtained while the geostationary satellite is moving in a first direction and longitude of the emitter is determined using observed frequencies obtained while the geostationary satellite is moving in a second direction.

20. The method according to claim 19, wherein the first direction is toward the ground station and the second direction is away from the ground station.

21. The method according to claim 17, further comprising:
receiving a signal from a calibration emitter and relayed by the geostationary satellite, the calibration emitter having a known transmit location and the signal from the calibration emitter being received at a ground station at a plurality of calibration time instances and having a plurality of observed calibration frequencies, one for each calibration time instance;
determining a plurality of calibration factors from the observed calibration frequencies;
for each of the observed frequencies, subtracting a corresponding one of the calibration factors from the observed frequency to form a plurality of calibrated frequencies; and
using the plurality of calibrated frequencies for said determining the transmit location of the emitter.

22. The method according to claim 21, wherein for each calibration factor subtracted from an observed frequency, the corresponding calibration time instance occurs at the same time to the time instance of the observed frequency.

23. The method according to claim 17, wherein each line of position is determined based on a difference in frequency of the received signal at two different time instances.

24. The method according to claim 23, further comprising determining the difference in frequency for each combination of time instances and applying Taylor-series linearization or maximum likelihood to obtain a solution of the emitter location.

25. The method according to claim 17, wherein the determined location of the emitter is updated as new measurements of observed frequencies are obtained.

26. The method according to claim 25, further comprising identifying a converged solution for the transmit location based on residual bias.

27. The method according to claim 25, further comprising identifying a converged solution for the transmit location based on root mean-square error.

28. The method according to claim 25, further comprising dividing measurements of observed frequencies into segments, with each segment containing a plurality of observed frequencies.

29. The method according to claim 17, wherein the signal from the emitter and relayed by the geostationary satellite comprises a modulated carrier.

30. The method according to claim 29, wherein each of the plurality of observed frequencies is determined by determining modulation of the modulated carrier, applying a transform to the modulated carrier and estimating frequency of the modulated carrier.

31. The method according to claim 30, wherein said estimating frequency of the modulated carrier is performed by computing a power spectrum of the transformed modulated carrier, identifying a frequency bin that contains a peak amplitude and performing interpolation to estimate the frequency of the modulated carrier.

32. The method according to claim 17, wherein the signal from the emitter and relayed by the geostationary satellite comprises a continuous wave signal.

33. The method according to claim 32, wherein each of the plurality of observed frequencies is determined by computing a power spectrum of the continuous wave signal, identifying a frequency bin that contains a peak amplitude and performing interpolation to estimate the frequency of the continuous wave signal.

34. A method of determining the transmit location of an emitter using a single geostationary satellite, the method comprising:
receiving a signal from the emitter and relayed by the geostationary satellite, the signal being received at a ground station at a plurality of time instances and having a plurality of observed frequencies, one for each time instance;
determining latitude of the emitter from observed frequencies obtained while the geostationary satellite is moving in a first direction;

determining longitude of the emitter from observed frequencies obtained while the geostationary satellite is moving in a second direction; and determining the transmit location of the emitter based on the determined latitude and longitude.

35. The method according to claim 34, wherein the first direction is toward the ground station and the second direction is away from the ground station.

36. A computer program product for determining the transmit location of an emitter, the computer program stored on a non-transitory computer readable medium and adapted to perform operations of:

receiving a signal from the emitter and relayed by the geostationary satellite, the signal being received at a ground station at first and second time instances;

determining a first line of position based on a first difference in frequency for the received signal between the first and second time instances;

receiving the signal from the emitter and relayed by the geostationary satellite, the signal being received at the ground station at third and fourth time instances;

determining a second line of position based on a second difference in frequency for the received signal between the third and fourth time instances; and determining the transmit location of the emitter based on the first line of position and the second line of position.

37. A computer program product for determining the transmit location of an emitter, the computer program stored on a non-transitory computer readable medium and adapted to perform operations of:

receiving a signal from the emitter and relayed by the geostationary satellite, the signal being received at a ground station at a plurality of time instances and having a plurality of observed frequencies, one for each time instance;

determining a plurality of lines of position based on the plurality of observed frequencies; and determining the transmit location of the emitter based on at least one intersection among the plurality of lines of position.

38. A computer program product for determining the transmit location of an emitter, the computer program stored on a non-transitory computer readable medium and adapted to perform operations of:

receiving a signal from the emitter and relayed by the geostationary satellite, the signal being received at a ground station at a plurality of time instances and having a plurality of observed frequencies, one for each time instance;

determining latitude of the emitter from observed frequencies obtained while the geostationary satellite is moving in a first direction;

determining longitude of the emitter from observed frequencies obtained while the geostationary satellite is moving in a second direction; and determining the transmit location of the emitter based on the determined latitude and longitude.

39. A system for determining the transmit location of an emitter using a single geostationary satellite, the system comprising:

a ground station for receiving a signal from the emitter and relayed by the geostationary satellite, the signal being received at a ground station at first and second time instances and the signal being received at the ground station at third and fourth time instances;

means for determining a first line of position based on a first difference in frequency for the received signal between the first and second time instances;

means for determining a second line of position based on a second difference in frequency for the received signal between the third and fourth time instances; and means for determining the transmit location of the emitter based on the first line of position and the second line of position.

40. A system for determining the transmit location of an emitter using a single geostationary satellite, the system comprising:

a ground station for receiving a signal from the emitter and relayed by the geostationary satellite, the signal being received at the ground station at a plurality of time instances and having a plurality of observed frequencies, one for each time instance;

means for determining a plurality of lines of position based on the plurality of observed frequencies; and means for determining the transmit location of the emitter based on at least one intersection among the plurality of lines of position.

41. A system for determining the transmit location of an emitter using a single geostationary satellite, the system comprising:

a ground station for receiving a signal from the emitter and relayed by the geostationary satellite, the signal being received at a ground station at a plurality of time instances and having a plurality of observed frequencies, one for each time instance;

means for determining latitude of the emitter from observed frequencies obtained while the geostationary satellite is moving in a first direction;

means for determining longitude of the emitter from observed frequencies obtained while the geostationary satellite is moving in a second direction; and means for determining the transmit location of the emitter based on the determined latitude and longitude.

* * * * *